United States Patent
White et al.

(10) Patent No.: US 9,506,515 B2
(45) Date of Patent: Nov. 29, 2016

(54) DISC BRAKE ROTOR FOR HEAVY-DUTY VEHICLES

(71) Applicant: HENDRICKSON USA, L.L.C., Itasca, IL (US)

(72) Inventors: Jay D. White, Massillon, OH (US); Jeffrey S. Morris, Stow, OH (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 0 days.

(21) Appl. No.: 14/332,443

(22) Filed: Jul. 16, 2014

(65) Prior Publication Data

US 2015/0021128 A1   Jan. 22, 2015

Related U.S. Application Data

(60) Provisional application No. 61/856,097, filed on Jul. 19, 2013.

(51) Int. Cl.
| | |
|---|---|
| *F16D 65/12* | (2006.01) |
| *F16D 65/847* | (2006.01) |
| *F16D 65/02* | (2006.01) |
| *F16D 66/00* | (2006.01) |

(52) U.S. Cl.
CPC ........... *F16D 65/128* (2013.01); *F16D 65/847* (2013.01); *F16D 2065/132* (2013.01); *F16D 2065/1328* (2013.01); *F16D 2066/003* (2013.01)

(58) Field of Classification Search
CPC ............... F16D 65/128; F16D 65/847; F16D 2065/132; F16D 2065/1328; F16D 2066/003
USPC ........ 188/218 XL, 18 A, 17, 264 A, 264 AA
See application file for complete search history.

(56) References Cited

U.S. PATENT DOCUMENTS

| | | | |
|---|---|---|---|
| 2,769,512 A | * | 11/1956 | Tack ............... F16D 65/123 118/264 |
| 2,800,982 A | | 7/1957 | Cottrell |
| 4,049,085 A | | 9/1977 | Blunier |
| 4,651,851 A | | 3/1987 | Latvala et al. |
| 4,930,606 A | | 6/1990 | Sporzynski et al. |
| 5,413,365 A | | 5/1995 | Bodin et al. |
| 5,507,367 A | | 4/1996 | Dagh et al. |

(Continued)

FOREIGN PATENT DOCUMENTS

| | | |
|---|---|---|
| CN | 101942599 A | 1/2011 |
| DE | 4230012 A1 | 3/1994 |

(Continued)

*Primary Examiner* — Melanie Torres Williams
(74) *Attorney, Agent, or Firm* — Dureska & Moore LLC; David P. Dureska; Greg Strugalski

(57) ABSTRACT

The invention is directed to a rotor of a disc brake system for heavy-duty vehicles. The rotor includes an inboard disc and an outboard disc. The outboard disc is spaced apart from the inboard disc, and a plurality of pins extends between and rigidly connects the inboard disc and the outboard disc. A sleeve includes an inboard end and an outboard end, and is disposed inside an inner perimeter of the outboard disc. A connecting member extends between and rigidly connects an inner perimeter of the inboard disc to the inboard end of the sleeve. The inboard disc attachment to the sleeve and the interconnecting pins cooperate to improve the resistance of the rotor to thermal stress created during braking, thereby increasing the performance and the life of the rotor.

29 Claims, 20 Drawing Sheets

(56) References Cited

U.S. PATENT DOCUMENTS

| | | |
|---|---|---|
| 5,509,510 A | 4/1996 | Ihm |
| 5,540,303 A | 7/1996 | Bodin et al. |
| 5,542,503 A | 8/1996 | Dunn et al. |
| 5,568,846 A | 10/1996 | Dagh et al. |
| 5,878,479 A * | 3/1999 | Dickerson ............. F16D 65/128 188/18 A |
| 5,988,613 A | 11/1999 | Dagh et al. |
| 6,119,820 A * | 9/2000 | Steptoe ................ F16D 65/128 188/218 XL |
| 6,135,247 A | 10/2000 | Bodin et al. |
| 6,152,270 A | 11/2000 | Giorgetti |
| 6,161,661 A | 12/2000 | Pahle et al. |
| 6,257,674 B1 | 7/2001 | Dagh et al. |
| 6,267,210 B1 | 7/2001 | Burgoon et al. |
| 6,330,937 B1 | 12/2001 | Dagh et al. |
| 6,357,557 B1 | 3/2002 | Di Ponio |
| 6,367,599 B2 | 4/2002 | Kobayashi |
| 6,374,956 B1 | 4/2002 | Naeumann et al. |
| 6,467,588 B1 | 10/2002 | Baumgartner et al. |
| 6,564,912 B1 | 5/2003 | Koschinat |
| 6,604,613 B2 | 8/2003 | Burgoon et al. |
| 6,619,440 B2 | 9/2003 | Antony et al. |
| D484,836 S | 1/2004 | Gavin |
| 6,722,479 B2 | 4/2004 | Baumgartner et al. |
| 7,032,724 B1 | 4/2006 | Hulten et al. |
| 7,066,306 B2 | 6/2006 | Gavin |
| 7,097,010 B1 | 8/2006 | Hulten et al. |
| 7,219,778 B2 | 5/2007 | Pete et al. |
| 7,228,946 B2 | 6/2007 | Baumgartner et al. |
| 7,255,205 B2 | 8/2007 | Plantan et al. |
| 7,281,769 B2 | 10/2007 | Pete et al. |
| 7,487,862 B2 | 2/2009 | Carlson et al. |
| 7,677,368 B2 * | 3/2010 | Tedesco ................ F16D 65/128 188/18 A |
| 7,690,484 B2 | 4/2010 | Oberti et al. |
| 7,703,583 B2 | 4/2010 | Oberti et al. |
| 7,779,969 B2 | 8/2010 | Gonska |
| 7,963,375 B2 | 6/2011 | Pahle |
| 7,997,391 B2 | 8/2011 | Burgoon et al. |
| 8,251,190 B2 | 8/2012 | Gey |
| 2003/0052562 A1 | 3/2003 | Antony et al. |
| 2004/0178031 A1 | 9/2004 | Gotti et al. |
| 2005/0126870 A1 | 6/2005 | Doppling et al. |
| 2005/0206148 A1 | 9/2005 | Nechvatal et al. |
| 2006/0272906 A1* | 12/2006 | Gonska ................... B60T 8/329 188/218 XL |
| 2007/0181390 A1 | 8/2007 | Korm |
| 2008/0060890 A1 | 3/2008 | Clark et al. |
| 2009/0218183 A1* | 9/2009 | Burgoon ................. B60T 8/329 188/218 XL |
| 2010/0258392 A1 | 10/2010 | Gaspers et al. |
| 2011/0067963 A1 | 3/2011 | Pahle |
| 2011/0108378 A1 | 5/2011 | Leone et al. |
| 2011/0127125 A1* | 6/2011 | Finch, Jr. ................. B61H 5/00 188/218 XL |
| 2011/0259683 A1 | 10/2011 | Hester |
| 2011/0278115 A1 | 11/2011 | Drewes |
| 2013/0075207 A1* | 3/2013 | Bruntz ................... B23P 15/00 188/218 XL |

FOREIGN PATENT DOCUMENTS

| | | |
|---|---|---|
| EP | 0666478 A1 | 8/1995 |
| KR | 2013013010 A * | 2/2013 |
| WO | 9314947 | 8/1993 |

\* cited by examiner

DISC BRAKE ROTOR FOR HEAVY-DUTY VEHICLES

CROSS-REFERENCE TO RELATED APPLICATIONS

This application claims the benefit of U.S. Provisional Patent Application Ser. No. 61/856, 097, which was filed on Jul. 19, 2013.

BACKGROUND OF THE INVENTION

Technical Field

The invention relates to the art of disc brakes for heavy-duty vehicles. More particularly, the invention relates to rotors of disc brakes for heavy-duty vehicles. Still more particularly, the invention is directed to a rotor of a disc brake, which includes an inboard attachment to a sleeve, pins that interconnect inboard and outboard discs of the rotor, and an improved metallurgical composition, all of which cooperate to improve the resistance of the rotor to thermal stress created during braking, thereby increasing the performance and the life of the rotor.

Background Art

Disc brake systems for vehicles are well known in the brake art. Such systems operate by forcing a pair of opposing brake pads against a rotor, thereby creating friction between the pads and the rotor to enable slowing and/or stopping of the vehicle. More particularly, a disc brake system includes a plurality of disc brake assemblies, in which each assembly is operatively mounted on or adjacent a wheel end of the vehicle.

Each disc brake assembly includes a carrier, which supports a caliper that is described in greater detail below, and is attached to a torque plate, typically by mechanical fasteners, such as bolts. The torque plate in turn is rigidly connected to an axle of an axle/suspension system of the vehicle, such as by welding. The torque plate resists the torque that is generated during braking, and maintains proper alignment of the carrier and caliper to ensure optimum operation of the components of the brake assembly.

As mentioned above, the carrier supports a caliper, and the caliper is formed with a bore for receiving one or more pistons and an actuator. The actuator typically is a brake air chamber, which is in fluid communication with a compressed air source and activates movement of the piston(s). The caliper also includes a reaction arm that is disposed opposite the piston(s). Each one of a pair of opposing brake pads includes friction material that is mounted on a backing plate, and is seated in the carrier, with one of the pads being adjacent the piston(s) and the other pad being adjacent the reaction arm. Upon actuation by the actuator, the piston(s) and the reaction arm cooperate to control movement of the brake pads.

The rotor includes a disc portion, which is disposed between the brake pads in a manner that allows the friction material of each pad to face a respective surface of the disc portion. The rotor also includes a mounting portion that is adapted for mounting to a respective wheel end assembly of the vehicle by mechanical fasteners, such as bolts. A sleeve typically is integrally formed with and extends between the disc portion and the mounting portion of the rotor. This construction enables the rotor to be rigidly connected to the wheel end assembly, and thus to a respective vehicle wheel.

During vehicle travel, when the vehicle brake system is engaged, compressed air flows to the actuator, which engages movement of the piston(s) and the reaction arm, which in turn forces the friction material of the pads against the disc portion of the rotor, slowing and/or stopping rotation of the rotor, thereby slowing and/or stopping rotation of the vehicle wheel. This forcing of the brake pad friction material against the disc portion of the rotor during braking generates a significant amount of heat, which in turn creates significant thermal stresses on the disc portion of the rotor.

It is well known in the art that significant thermal stresses tend to decrease the performance and the life of the rotor. As a result, it is desirable to employ features in a rotor that are designed to increase air flow and/or dissipate heat. Such features reduce the amount of heat experienced by the disc portion of the rotor during braking, which in turn reduces the thermal stresses on the rotor and improve its performance and life.

A typical disc portion of a prior art rotor includes an inboard disc and an outboard disc, which are spaced apart from one another and are interconnected by a plurality of vanes. More particularly, the inboard disc includes an inboard surface and an outboard surface, and the outboard disc includes an inboard surface and an outboard surface. The inboard surface of the inboard disc is adjacent the friction material of a respective one of the brake pads, and the outboard surface of the outboard disc is adjacent to the friction material of the other one of the brake pads. The outboard surface of the inboard disc and the inboard surface of the outboard disc face or oppose one another, and the vanes are integrally connected to and extend between these surfaces. The vanes are thick ribbon-like structural members that extend radially from the centers or inner perimeters of the respective discs to their outer perimeters. This construction provides a rigid connection between the inboard and outboard discs, while also creating air passages between the discs.

It has been believed in the prior art that such a plurality of air passages between the inboard and outboard discs promoted "pumping" of air between the discs during vehicle travel, thereby providing optimal air flow in the disc portion of the rotor to dissipate heat. However, vane-type connections may not actually optimize air flow between the inboard and outboard discs. As a result, it is desirable to provide means of interconnecting the inboard and outboard discs that increases air flow, and thus heat dissipation, beyond that of vane-type connections.

In addition, for optimum functioning of the brake system, it is desirable for the disc portion of the rotor to be maintained in a vertical orientation, which provides a square, even contact of the inboard surface of the inboard disc with the friction material of its adjacent brake pad, and a square, even contact of the outboard surface of the outboard disc with the friction material of its adjacent brake pad. However, it is known in the art that the heat which is generated from the friction of the brake pads being forced against the disc portion of the rotor causes the disc portion to expand radially. In addition, the heat generated from the friction of the brake pads being forced against the disc portion of the rotor creates a thermal gradient across the rotor sleeve, with the sleeve being hotter in the inboard area that is adjacent the rotor disc portion than the outboard area that is away from the rotor disc portion. This thermal gradient causes the rotor sleeve to expand at the inboard area that is adjacent the rotor disc portion. The radial expansion of the disc portion of the rotor and the expansion of the rotor sleeve adjacent the rotor disc portion causes the outer perimeter of the disc portion to move slightly from its desired vertical orientation and in the direction of the rotor sleeve. The rotor disc portion thereby angles or tilts in the direction of the rotor sleeve, that is, in the outboard direction. Such tilting of the rotor disc portion due to the heat generated from braking is referred to in the art as coning.

When the rotor disc portion experiences coning, the inboard surface of the inboard disc is no longer in square, even contact with the friction material of its adjacent brake pad, and the outboard surface of the outboard disc is no longer in square, even contact with the friction material of its adjacent brake pad. Such uneven contact between the inboard disc and its adjacent brake pad, and the outboard disc and its adjacent brake pad, reduces the efficiency of the brake system. In addition, such uneven contact may create stress areas at each point of uneven contact between the brake pads and the inboard and outboard discs, which may cause the formation of cracks in the rotor disc portion, thereby reducing the life of the rotor. Such uneven contact between the inboard disc and its adjacent brake pad, and the outboard disc and its adjacent brake pad, also undesirably reduces the life of the brake pads.

The coning of the rotor disc portion has been exacerbated in the prior art due to the nature of the connection between the disc portion and the rotor sleeve that has been employed. More particularly, the radial center or inner perimeter of the outboard disc is integrally connected to the rotor sleeve, while the inboard disc is connected to the outboard disc through the above-described vanes. Because the outboard disc includes the connection to the sleeve at its radial center or inner perimeter, a portion of the heat that is encountered by this disc is conveyed away from the disc to the sleeve. As a result, the radial expansion of the outboard disc during braking is less than that of the inboard disc, and this difference in radial expansion between the discs causes the disc portion to cone further in the direction of the sleeve. Such additional coning undesirably increases uneven contact between the inboard disc and its adjacent brake pad, and the outboard disc and its adjacent brake pad, further reducing the efficiency of the brake system and the life of the brake pads. Moreover, an increase in such uneven contact may undesirably increase the stress at each point of uneven contact between the brake pads and the respective inboard and outboard discs, which may in turn increase the formation of cracks in the rotor disc portion, thereby further reducing the life of the rotor. As a result, it is desirable to provide means of connecting the rotor disc portion to the sleeve that reduces coning, and thus optimizes the performance of the brake system, the life of the rotor, and the life of the brake pads.

Moreover, rotors for heavy-duty vehicles have traditionally been formed from cast iron in order to exhibit the strength, hardness and stability required for the braking operation. In the prior art, such rotors have been formed with a high carbon content to maintain the heat transfer properties of the disc portion, which enables the rotor to dissipate heat to reduce the thermal stresses on the rotor, thereby improving the performance and life of the rotor. For example, in the prior art, the carbon content of a rotor has typically been greater than about four (4) weight percent (%) carbon. While such a high carbon content has provided good heat transfer properties, it creates a rotor that is undesirably brittle. When a rotor is brittle, it has little ability to resist high temperature stresses, and as a result, prior art rotors with a high carbon content may undesirably experience crack initiation and propagation. In addition, such a high carbon content undesirably reduces the strength of the rotor at elevated temperatures, which is also referred to in the art as a reduction of the rotor's hot strength. Therefore, it is desirable to provide a rotor that includes a metallurgical composition which desirably maintains the heat transfer properties of the rotor, while decreasing the brittleness and improving the hot strength associated with prior art high-carbon compositions.

As a result, there is a need in the art for a rotor of a disc brake for heavy-duty vehicles that provides means of interconnecting the inboard disc and the outboard disc to increase air flow beyond that of vane-type connections, provides means of connecting the rotor disc portion to the rotor sleeve that reduces coning of the rotor during braking, and includes a metallurgical composition which desirably maintains the heat transfer properties of the rotor while decreasing the brittleness and improving the hot strength of the rotor, all of which improve the resistance of the rotor to thermal stress created during braking, thereby increasing the performance and the life of the rotor, and which also increase the life of the brake pads. The improved disc brake rotor for heavy-duty vehicles of the present invention satisfies these needs, as will be described in detail below.

BRIEF SUMMARY OF THE INVENTION

An objective of the present invention is to provide a rotor of a disc brake for heavy-duty vehicles that provides means of interconnecting the inboard disc and the outboard disc of the rotor to increase air flow beyond that of vane-type connections.

Another objective of the present invention is to provide a rotor of a disc brake for heavy-duty vehicles that provides means of connecting the rotor disc portion to the rotor sleeve that reduces coning of the rotor during braking.

Still another objective of the present invention is to provide a rotor of a disc brake for heavy-duty vehicles that includes a metallurgical composition which desirably maintains the heat transfer properties of the rotor while decreasing the brittleness and improving the hot strength of the rotor.

Yet another objective of the present invention is to provide a rotor of a disc brake for heavy-duty vehicles that improves the resistance of the rotor to thermal stress created during braking, thereby increasing the performance and the life of the rotor and increasing the life of the brake pads.

These objectives and others are obtained by the improved disc brake rotor for heavy-duty vehicles of the present invention. In an exemplary embodiment of the invention, the rotor includes an inboard disc and an outboard disc. The outboard disc is spaced apart from the inboard disc, and a plurality of pins extends between and rigidly connects the inboard disc and the outboard disc. A sleeve includes an inboard end and an outboard end, and is disposed inside an inner perimeter of the outboard disc. A connecting member extends between and rigidly connects an inner perimeter of the inboard disc to the inboard end of the sleeve.

BRIEF DESCRIPTION OF THE SEVERAL VIEWS OF THE DRAWINGS

The preferred embodiments of the invention, illustrative of the best mode in which Applicant has contemplated applying the principles of the invention, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

Figure 1:
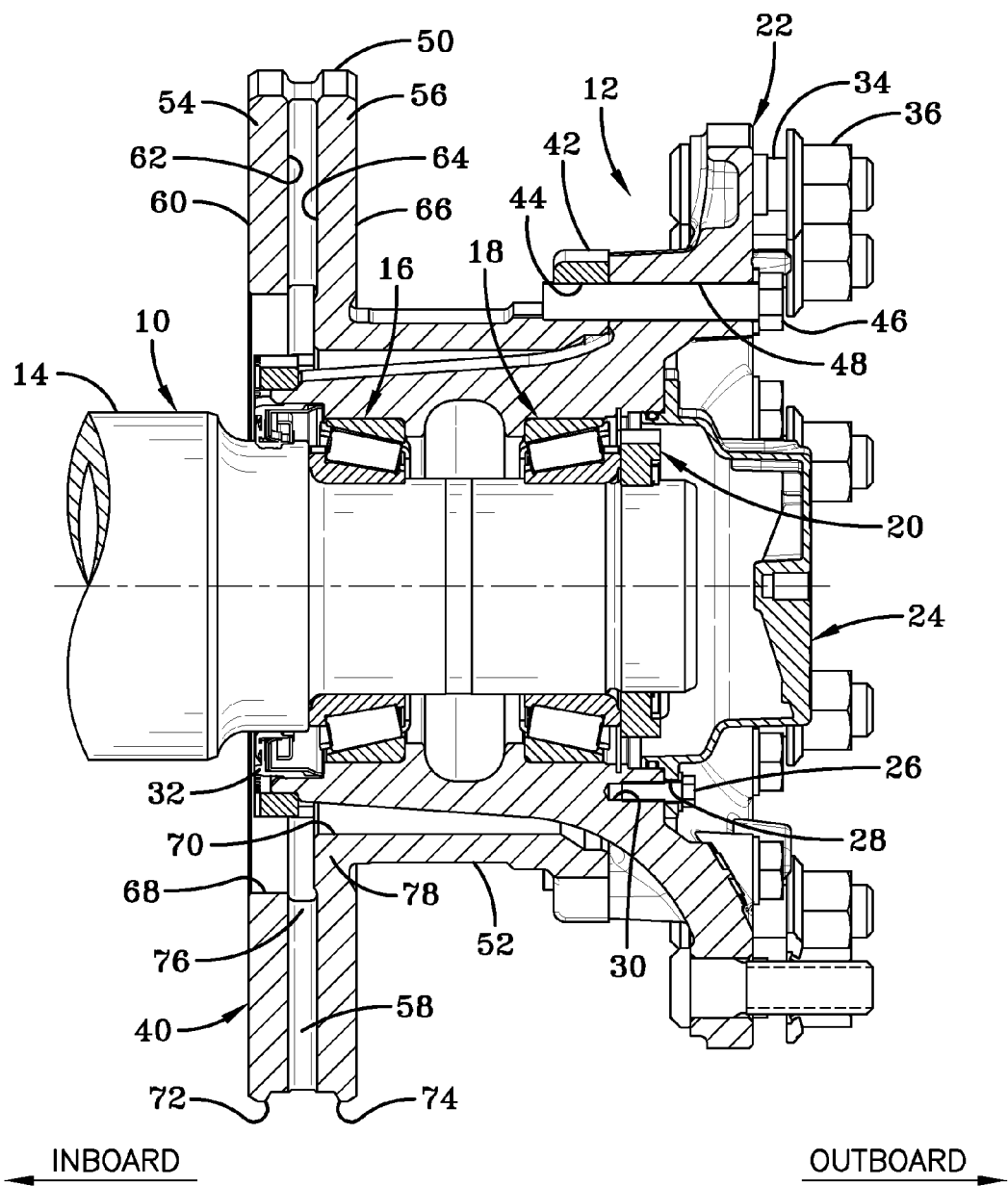
FIG. 1 is a fragmentary side elevational view, shown partially in cross section, of a prior art disc brake rotor for heavy-duty vehicles, attached to a wheel end assembly that is mounted on an axle spindle.

In order to better understand the improved disc brake rotor for heavy-duty vehicles of the present invention and the environment in which it operates, a prior art disc brake rotor for heavy-duty vehicles 40 is shown in FIG. 1, and now will be described. The environment for rotor 40 includes one or more axles 10, which typically depend from and extend transversely across a heavy-duty vehicle (not shown). Heavy-duty vehicles include trucks and tractor-trailers or semi-trailers, and the tractor-trailers or semi-trailers typically are equipped with one or more trailers. Reference herein shall be made generally to a heavy-duty vehicle for the purpose of convenience, with the understanding that such reference includes trucks, tractor-trailers and semi-trailers, and trailers thereof. Each axle 10 has two ends, with a wheel end assembly 12 mounted on each one of the ends. For the purposes of convenience and clarity, only one end of axle 10 and its respective wheel end assembly 12 will be described herein.

Axle 10 includes a central tube (not shown), and an axle spindle 14 is integrally connected, by any suitable means such as welding, to each end of the central tube. Wheel end assembly 12 includes a bearing assembly having an inboard bearing 16 and an outboard bearing 18 immovably mounted on the outboard end of axle spindle 14. A spindle nut assembly 20 threadably engages the outboard end of axle spindle 14 and secures bearings 16, 18 in place. A wheel hub 22 is rotatably mounted on inboard and outboard bearings 16, 18 in a manner well known to those skilled in the art.

A hub cap 24 is mounted on the outboard end of hub 22 by a plurality of bolts 26, each one of which passes through a respective one of a plurality of openings 28 formed in the hub cap, and threadably engages a respective one of a plurality of aligned threaded openings 30 formed in the hub. In this manner, hub cap 24 closes the outboard end of wheel end assembly 12. A main continuous seal 32 is rotatably mounted on the inboard end of wheel end assembly 12 and closes the inboard end of the assembly. In a typical heavy-duty vehicle dual-wheel configuration, a plurality of threaded bolts 34 and mating nuts 36 are used to mount one tire rim or a pair of tire rims (not shown), depending on specific design considerations, on wheel end assembly 12. Each one of a pair of tires (not shown) is mounted on a respective one of the tire rims, as known in the art.

Rotor 40 includes a radially-extending mounting portion or flange 42, which is formed with openings 44 to receive mechanical fasteners 46, such as bolts. Hub 22 is formed with corresponding openings 48, thereby enabling bolts 46 to pass through aligned ones of the hub openings and rotor flange openings 44 to removably secure rotor 40 to the hub. This construction enables rotor 44 to rotate with hub 22, while being removable from the hub for servicing.

Rotor 40 also includes a radially-extending disc portion 50, the construction of which will be described in greater detail below. Disc portion 50 is disposed between a pair of opposing brake pads (not shown) in a manner known in the art. An axially-extending rotor sleeve 52 is integrally formed with and extends between disc portion 50 and mounting flange 42. Sleeve 52 enables rotor disc portion 50 to be rigidly connected to mounting flange 42 and thus wheel end assembly 12.

Disc portion 50 of prior art rotor 40 includes an inboard disc 54 and an outboard disc 56, which are spaced apart from one another and are interconnected by a plurality of vanes 58. More particularly, inboard disc 54 includes an inboard surface 60 and an outboard surface 62, and outboard disc 56 includes an inboard surface 64 and an outboard surface 66. Inboard surface 60 of inboard disc 54 is adjacent the friction material of a respective one of a pair of brake pads (not shown), and outboard surface 66 of outboard disc 56 is adjacent to the friction material of the other one of the pair of brake pads. Outboard surface 62 of inboard disc 54 and inboard surface 64 of outboard disc 56 face one another or are opposed, and vanes 58 are integrally formed with and extend between these surfaces. Vanes 58 are thick ribbon-like structural members that extend radially from an inner perimeter 68 of inboard disc 54 and an inner perimeter 70 of outboard disc 56 to a perimeter 72 of the inboard disc and a perimeter 74 of the outboard disc, respectively. In this manner, vanes 68 provide a rigid connection between inboard disc 54 and outboard disc 56, while forming radially-extending air passages 76 between the vanes.

The integral connection of disc portion 50 and sleeve 52 includes a bend 78. More particularly, radially-extending outboard disc 56 and axially-extending sleeve 52 meet at ninety-degree bend 78. This connection of sleeve 52 to outboard disc 56 of disc portion 50 is typical in the prior art, as it is convenient to connect the sleeve, which is disposed axially outboardly of the disc portion, to the outboard disc.

Prior art rotor 40 typically is formed of cast iron with a high carbon content to maintain the heat transfer properties of disc portion 50 in order to dissipate heat that is generated by friction during the braking operation. For example, prior art rotor 40 includes a carbon content that is greater than about four (4) weight percent (%) carbon.

Prior art rotor 40, while satisfactory for its intended purpose, includes certain disadvantages. For example, air passages 76 formed by vanes 58 between inboard disc 54 and outboard disc 56 may not optimize the air flow between the discs to effectively dissipate heat from braking, and thus may not optimize the reduction of thermal stresses on the rotor. In addition, the radial expansion of rotor disc portion 50 and the expansion of rotor sleeve 52 adjacent the rotor disc portion due to heat from braking causes coning of the disc portion in the direction of the sleeve, that is, in an outboard direction. Also, the connection of sleeve 52 to outboard disc 56 of disc portion 50 may convey some of the heat encountered by the outboard disc during braking to be conveyed away from the outboard disc to the sleeve, resulting in a radial expansion of the outboard disc that is less than that of inboard disc 54, exacerbating coning of the disc portion in the direction of the sleeve. Such coning may undesirably create uneven contact between inboard disc 54 and its adjacent brake pad, and outboard disc 56 and its adjacent brake pad, reducing the efficiency of the brake system, and the life of the brake pads.

Such coning may also undesirably increase the stress at each point of uneven contact between the brake pads and each respective inboard disc 54 and outboard disc 56, which may in turn increase the tendency of cracks to form and enlarge or propagate in rotor disc portion 50, thereby reducing the life of rotor 40. Moreover, prior art rotor 40 includes a carbon content that is greater than about four (4) weight percent (%) carbon, which is a high carbon content that provides good heat transfer properties, but makes the rotor undesirably brittle and may thus undesirably allow the rotor to experience crack initiation and propagation, and undesirably reduces the hot strength of the rotor.

As a result, there is a need in the art for a rotor of a disc brake for heavy-duty vehicles that provides means of interconnecting an inboard disc and an outboard disc to increase air flow beyond that of vane-type connections, provides means of connecting a rotor disc portion to a rotor sleeve that reduces coning of the rotor during braking, and includes a metallurgical composition which desirably maintains the heat transfer properties of the rotor while decreasing the brittleness of the rotor and improving the hot strength of the rotor, all of which improve the resistance of the rotor to thermal stress created during braking, thereby increasing the performance and the life of the rotor, and which also increase the life of the brake pads. The improved disc brake rotor for heavy-duty vehicles of the present invention satisfies these needs, as now will be described.

Figure 2:
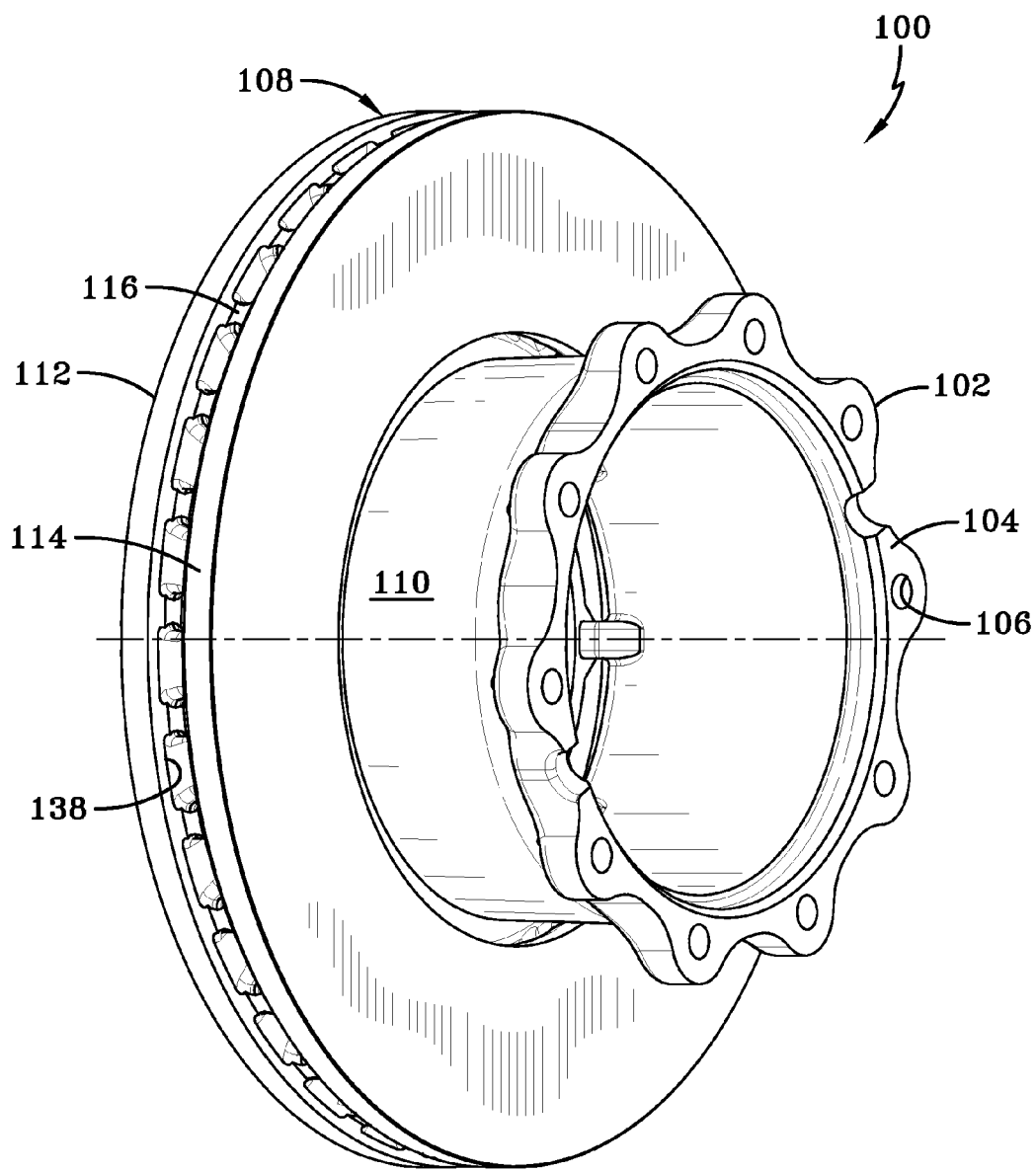
FIG. 2 is an outboard perspective view of a first exemplary embodiment of the improved disc brake rotor for heavy-duty vehicles of the present invention.
Figure 3:
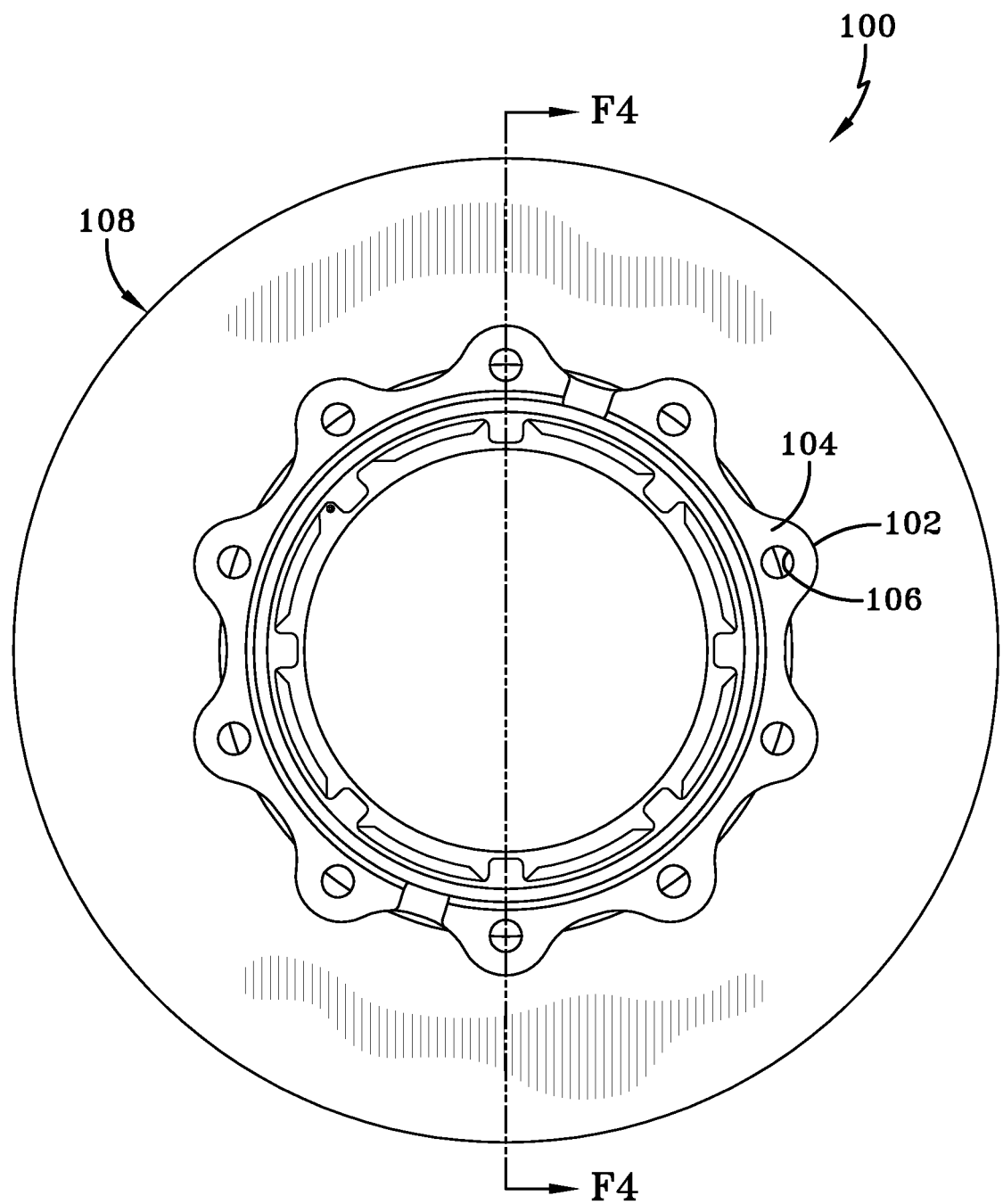
FIG. 3 is an outboard elevational view of the improved disc brake rotor shown in FIG. 2.
Figure 4:
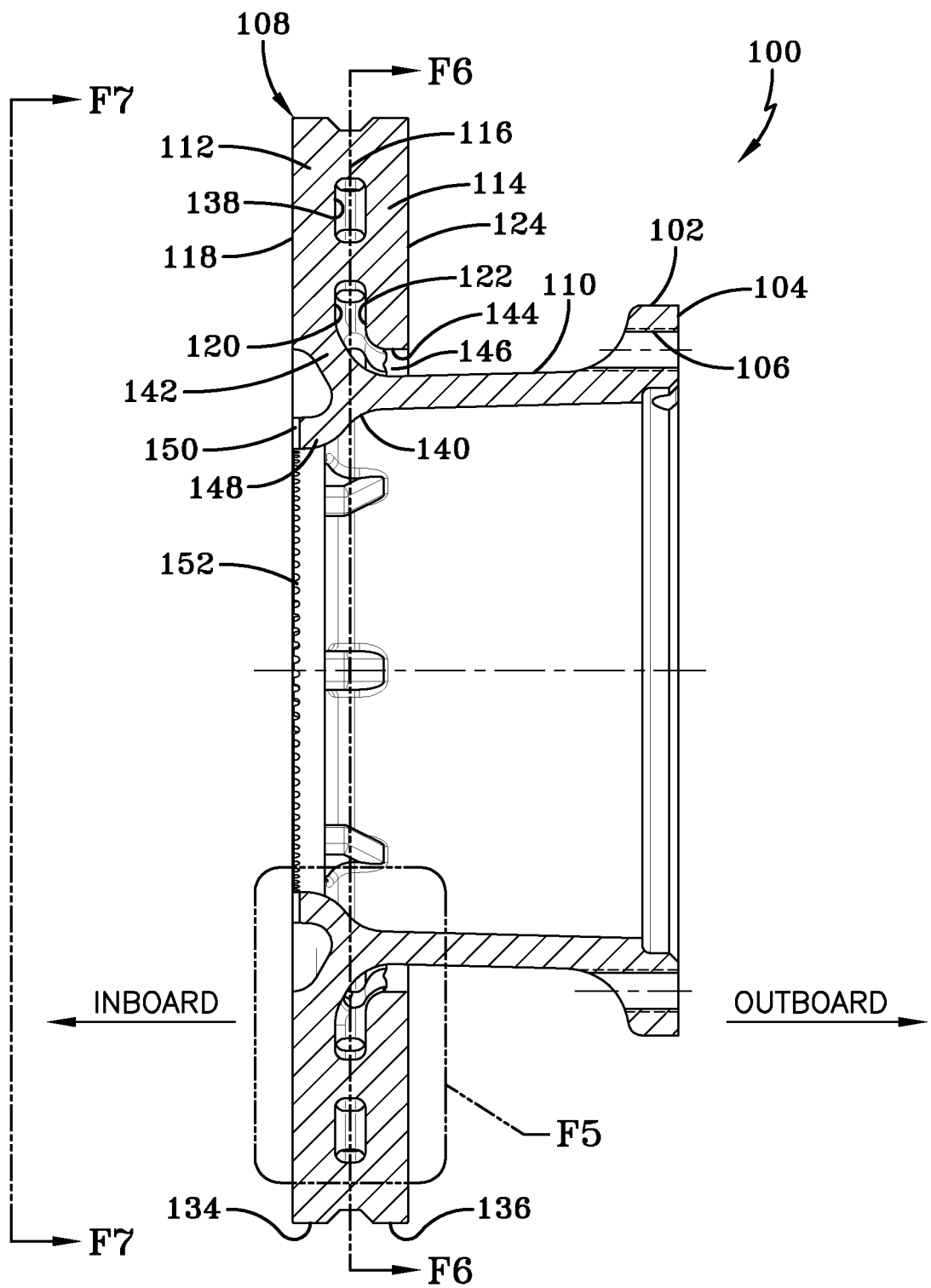
FIG. 4 is a cross-sectional view of the improved disc brake rotor taken along line F4-F4 in FIG. 3.

A first embodiment of the improved disc brake rotor for heavy-duty vehicles of the present invention is indicated generally at 100 and is shown in FIGS. 2-7. As will be described in detail below, rotor 100 of the present invention includes an inboard attachment to a rotor sleeve and thus to a hub of a wheel end assembly, which reduces coning of the rotor during braking. Rotor 100 of the present invention also includes pins that interconnect inboard and outboard discs of the rotor, which increase air flow between the discs beyond that of prior art vane-type connections. Moreover, rotor 100 of the present invention includes an improved metallurgical composition that desirably maintains the heat transfer properties of the rotor while decreasing the brittleness of the rotor and improving the hot strength of the rotor. These features cooperate to improve the resistance of rotor 100 to thermal stress created during braking, thereby increasing the performance and the life of the rotor, and also increasing the life of the brake pads. With particular reference to FIGS. 2-4, rotor 100 includes a radially-extending mounting portion or flange 102, which is formed with bosses 104 and respective openings 106 in each of the bosses to receive mechanical fasteners, such as bolts 46 (FIG. 1). Bolts 46 pass through aligned ones of rotor flange openings 106 and hub openings 48 (FIG. 1) to removably secure rotor 100 to hub 22 (FIG. 1). This construction enables rotor 100 to rotate with hub 22, while being removable from the hub for servicing.

Rotor 100 also includes a radially-extending disc portion 108, the construction of which will be described in greater detail below. Disc portion 108 is disposed between a pair of opposing brake pads (not shown) in a manner known in the art. An axially-extending rotor sleeve 110 is integrally formed with and extends between disc portion 108 and mounting flange 102. Sleeve 110 enables rotor disc portion 108 to be integrally formed with mounting flange 102 and thus connected to wheel end assembly 12.

Figure 6:
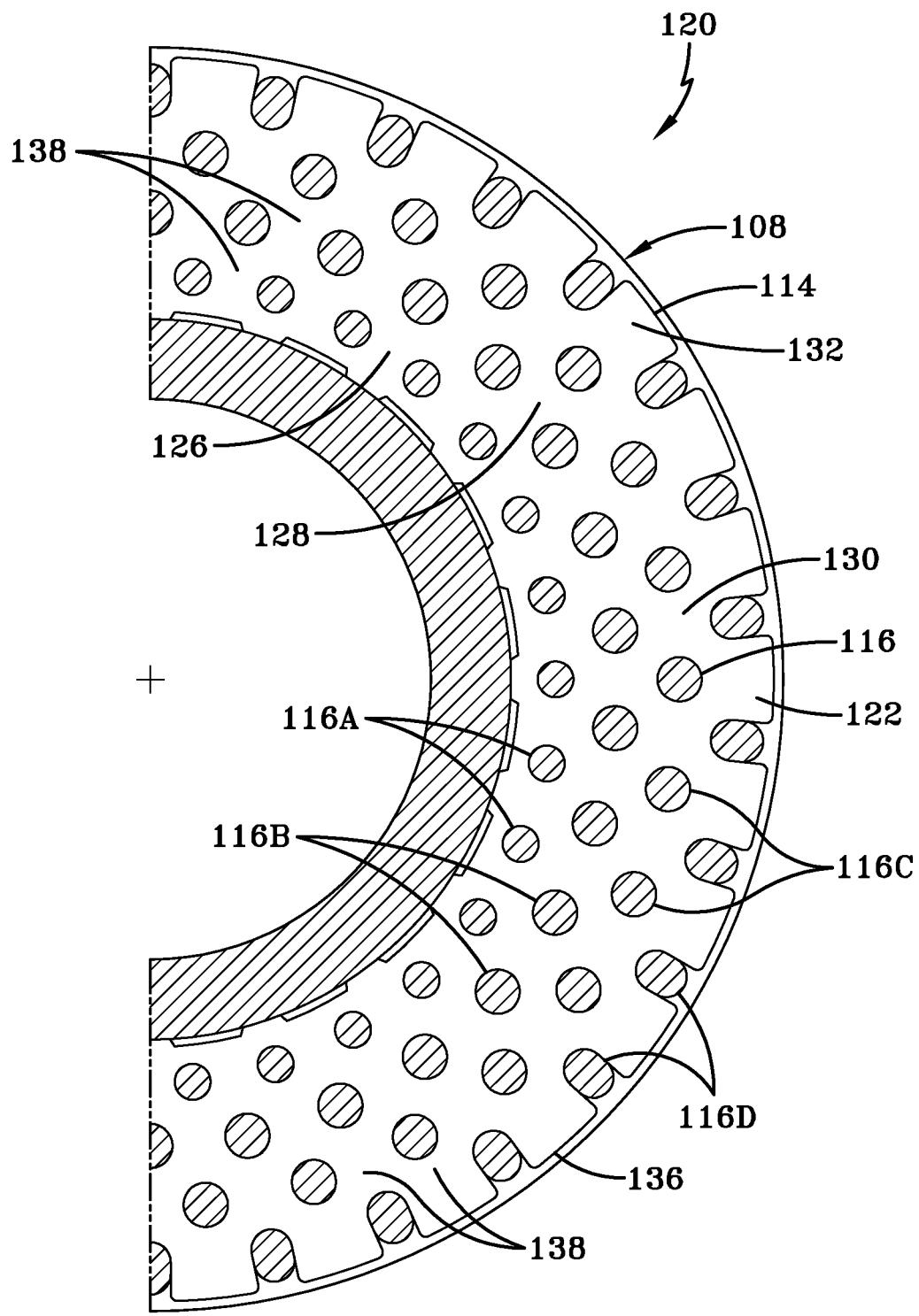
FIG. 6 is a partial cross-sectional view of a portion of the improved disc brake rotor taken along line F6-F6 in FIG. 4.
Figure 7:
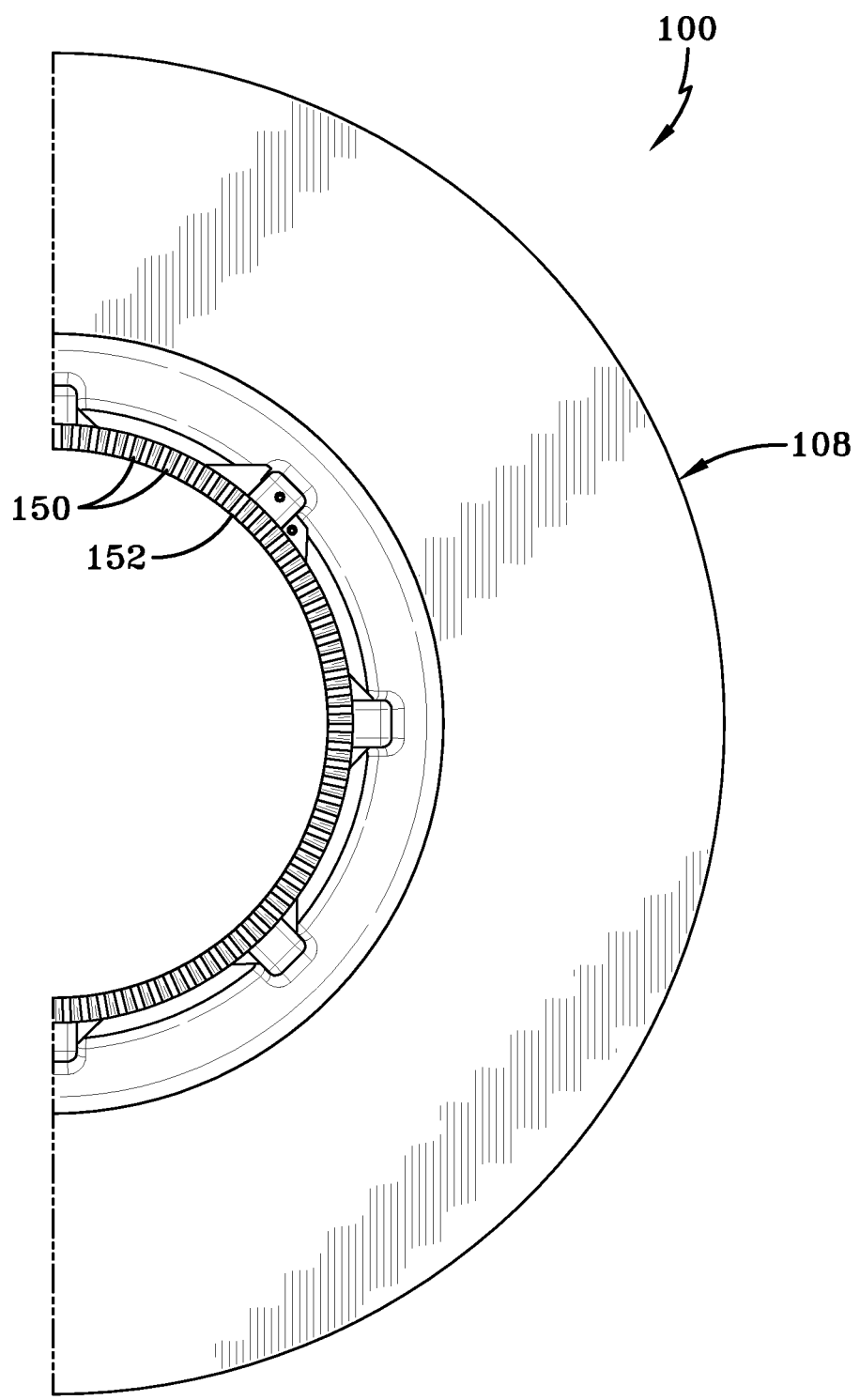
FIG. 7 is a partial elevational view, looking in the outboard direction, of the improved disc brake rotor shown from line F7-F7 in FIG. 4.

As best shown in FIGS. 4 and 6, disc portion 108 of rotor 100 includes an inboard disc 112 and an outboard disc 114, which are spaced apart from one another and are interconnected by a plurality of pins or posts 116. More particularly, inboard disc 112 includes an inboard surface 118 and an outboard surface 120, and outboard disc 114 includes an inboard surface 122 and an outboard surface 124. Inboard surface 118 of inboard disc 112 is adjacent the friction material of a respective one of a pair of brake pads (not shown), and outboard surface 124 of outboard disc 114 is adjacent to the friction material of the other one of the pair of brake pads. Outboard surface 120 of inboard disc 112 and inboard surface 122 of outboard disc 114 face one another, and pins 116 are integrally formed with and extend between these surfaces.

By way of example, pins 116 optionally include a round cross-sectional geometry, and are in a range of from about 12 millimeters to about 15 millimeters in diameter. In addition, it is preferable for pins 116 to be arranged in bolt-style, concentric circles between inboard disc 112 and outboard disc 114. For example, a first or radially innermost pin circle 126 preferably includes about thirty (30) pins 116A, each having a diameter of about 12 millimeters. A second pin circle 128 is disposed radially outwardly of first pin circle 126, with about thirty (30) pins 116B being circumferentially offset from respective pins 116A of the first pin circle, and each pin having a diameter of about 15 millimeters. A third pin circle 130 is disposed radially outwardly of second pin circle 128, with about thirty (30) pins 116C being circumferentially offset from respective pins 116B of the second pin circle, circumferentially aligned with respective pins 116A of first pin circle 126, and each pin having a diameter of about 15 millimeters. A fourth pin circle 132 is disposed radially outwardly of third pin circle 130, with about thirty (30) pins 116D being circumferentially offset from respective pins 116C of the third pin circle, and circumferentially aligned with respective pins 116B of second pin circle 128. Fourth pin circle 132 is disposed adjacent a perimeter 134 of inboard disc 112 and a perimeter 136 of outboard disc 114, with each pin 116D having a diameter of about 15 millimeters.

It is to be understood that pins 116 can be any radially broken structure, and other geometric configurations, sizes, and patterns of the pins may be employed without affecting the overall concept or operation of the invention, such as wedges, tear drops, ovals, ellipses, and the like. In this manner, pins 116 provide a rigid connection between inboard disc 112 and outboard disc 114, while forming a significant amount of air space or air passages 138 between the inboard and outboard discs, which enables air flow, including lateral air flow, between the discs.

As described above, prior art rotor 40 (FIG. 1) employs vanes 58 between inboard disc 54 and outboard disc 56, rather than pins 116. In the heavy-duty vehicle industry, vanes 58 had been considered to provide optimum air flow between inboard disc 54 and outboard disc 56 by "pumping" air between the discs during vehicle operation. Upon the development of rotor 100 of the present invention, computational fluid dynamics (CFD) analysis was performed, comparing prior art rotor 40 employing vanes 58 to the rotor of the invention employing pins 116.

The CFD analysis models were constructed to reflect a heavy-duty vehicle structure, including a brake assembly and wheel end assembly with a tire installed, in order to ensure optimum accuracy. To provide further assurance of optimum accuracy, the models also included rotation of the wheel, tire, and rotor 40, 100 with an air stream moving past the rotating components to more accurately simulate the true operating environment of a heavy-duty vehicle.

With a tire installed, the analysis indicated that very little air flow through each rotor 40, 100 actually occurred. In addition, the analysis indicated that, due to such a low amount of air flow, vanes 58 of prior art rotor 40 actually blocked air from flowing laterally through the rotor. The analysis further indicated that air flow through rotor 100 of the invention, employing pins 116, was greater than that of prior art rotor 40, and that the rotor of the invention experienced a temperature decrease when compared to the prior art rotor.

Based upon industry-standard teachings, the CFD analysis with the above-described models thus yielded an unexpected result for rotor 100 of the invention when compared to prior art rotor 40. Based upon the analysis, it is believed that the significant amount of air space or air passages 138 between inboard disc 112 and outboard disc 114 enabled by pins 116 provides increased air flow through rotor 100, including lateral air flow between the discs, which in turn provides increased cooling when compared to vanes 58 of prior art rotor 40 that block lateral air flow. It is further believed that such increased air flow enabled by and pins 116 is unique to heavy-duty vehicles because the revolutions-per-minute (rpms) of the vehicle tires during vehicle operation are lower, and the wheel diameters are larger, than those in other industries.

In this manner, rotor 100 of the invention, by employing pins 116, increases air flow through rotor disc portion 108, which dissipates heat and reduces thermal loading of the disc portion. Reduction of thermal loading of rotor disc portion 108 reduces potential cracking of rotor 100, thereby improving the performance and the life of the rotor. In addition, pins 116 create a discontinuous radial connection between inboard disc 112 and outboard disc 114, compared to continuously connected radially-extending vanes 58 of the prior art. In the event a crack forms on inboard disc 112 and/or outboard disc 114, the discontinuous radial connection created by pins 116 acts to prevent propagation of the crack, thereby further improving the performance and the life of rotor 100.

Figure 5:
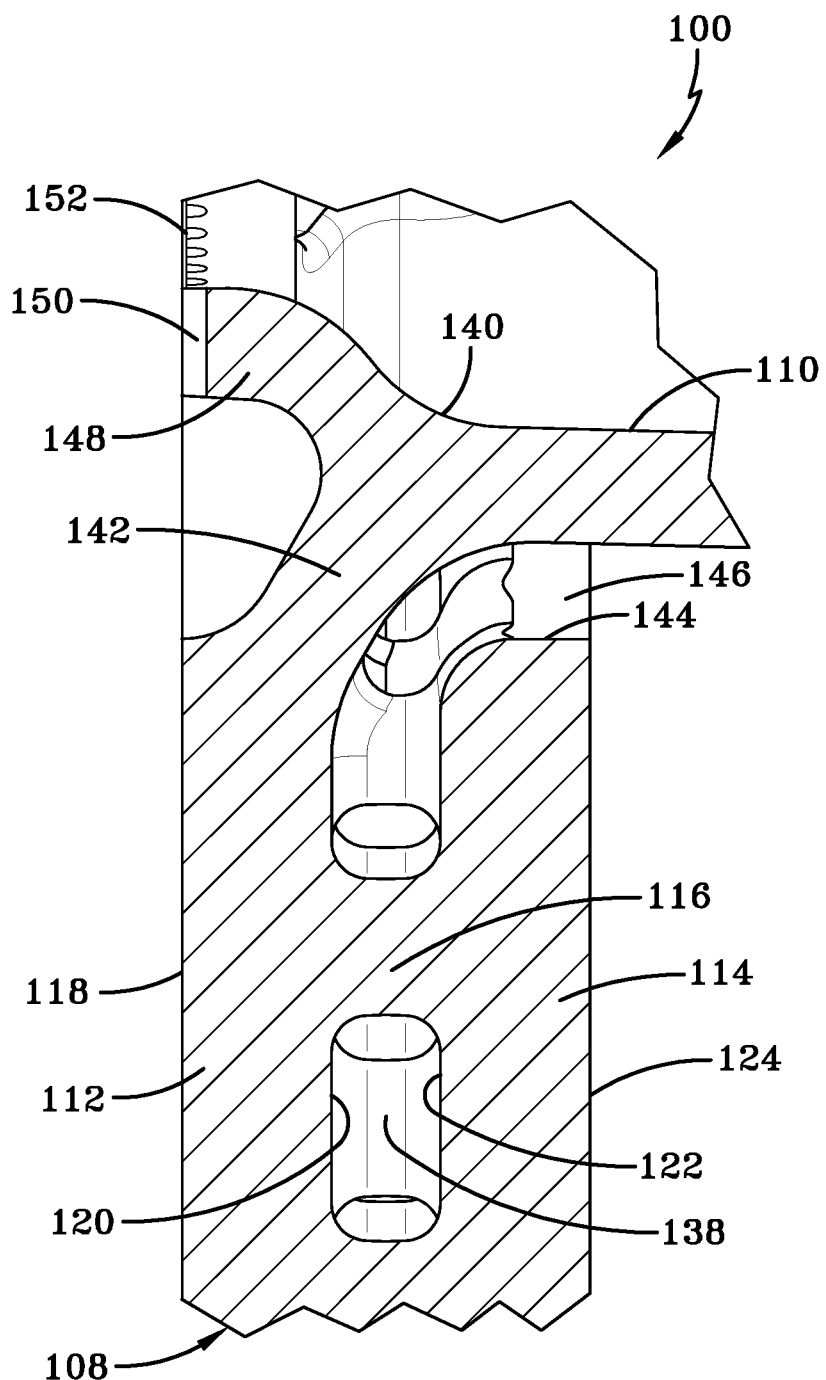
FIG. 5 is an enlarged fragmentary cross-sectional view of a portion of the improved disc brake rotor taken from the enclosed area labeled F5 in FIG. 4.

Turning now to FIGS. 4 and 5, disc portion 108 is attached to rotor sleeve 110 by an inboard connection 140. More particularly, connection 140 includes an angled connection member 142 that passes radially inside an inner perimeter 144 of outboard disc 114, thereby creating a gap 146 between sleeve 110 and the outboard disc. Connection member 142 includes a smooth compound angle to transition from the axial orientation of sleeve 110 to the radial orientation of inboard disc 112. With additional reference to FIG. 7, connection member 142 optionally also includes a radially inward member 148 that enables the optional integral formation of teeth 150 for a tone ring 152 of an anti-lock braking system (ABS) sensor. The formation and/or configuration of tone ring 152 depends on particular design considerations, as rotor 100 may be formed without a tone ring, formed with a different configuration of tone ring, or formed with features to accept a discrete tone ring, as will be described in greater detail below.

With particular reference to FIG. 4, the radial expansion of disc portion 108 and the expansion of rotor sleeve 110 adjacent the disc portion due to heat from braking causes coning of the disc portion in the direction of the sleeve. However, connection member 142 transfers heat from inboard disc 112 to sleeve 110. This heat transfer results in a radial expansion of inboard disc 112 that is less than that of outboard disc 114, which causes rotor disc portion to cone away from sleeve 110, thereby offsetting the coning of the disc portion in the direction of the sleeve. As a result, rotor 100, by providing inboard connection 140, enables the radial expansion of disc portion 108 to essentially balance out, thereby reducing or eliminating coning. Such a reduction or an elimination of coning promotes uniform contact between inboard disc 112 and its adjacent brake pad, and outboard disc 114 and its adjacent brake pad, thereby optimizing the efficiency of the brake system and increasing the life of the brake pads. Such a reduction or an elimination of coning also desirably reduces the stress at each point of contact between the brake pads and each respective inboard disc 112 and outboard disc 114 when compared to prior art rotor 40, which may in turn decrease the tendency of cracks to form in rotor disc portion 108, thereby increasing the life of rotor 100.

Inboard connection 140 of rotor 100 finds an additional advantage in air disk brake applications. More particularly, air disc brake units tend to be heavy, and as mentioned above, are rigidly mounted to a respective axle 10 (FIG. 1) inboardly of wheel end assembly 12. Such air disc brake units also often depend on vibration resulting from vehicle operation to release the outboard brake pad (not shown) from contact with outboard rotor disc 114. Due to the weight of an air disc brake unit, such a release of the outboard brake pad can be difficult. However, rotor 100, by providing inboard connection 140, creates an axial displacement of outboard surface 124 in the inboard direction as the rotor cools. This cooling displacement creates a running clearance between outboard surface 124 of outboard disc 114 and its respective brake pad, which makes release of the outboard brake pad from the outboard disc easier.

Such a cooling displacement was not present in prior art rotor 40 with its outboard connection, which led to undesirable wear of the outboard brake pad. This wear was further exacerbated by the outboard connection of prior art rotor 40, as the connection created an axial displacement of outboard surface 66 (FIG. 1) of outboard disc 56 in the outboard direction as the rotor cooled. Such displacement of outboard surface 66 in the outboard direction undesirably decreased the ability of the outboard brake pad to release from contact with outboard disc 56, further increasing undesirable wear of the outboard brake pad. As a result, rotor 100, by employing inboard connection 140, reduces undesirable wear of the outboard brake pad and in turn increases the life of the pad in air disc brake applications.

In addition, when a brake pad remains in contact with a rotor 40 during vehicle operation, a condition known as light high-speed drag is created. When rotor 40 experiences light high-speed drag, there is a probability that Martensite, which is a brittle form of steel crystalline structure, may form in the rotor, which in turn undesirably allows cracks to form and/or propagate in the rotor. The inboard connection 140 of rotor 100 and its cooling displacement, in combination with the improved air flow enabled by pins 116, desirably increase the rate at which outboard surface 124 of outboard disc 56 disengages the outboard brake pad, thereby reducing light high-speed drag and the probability of creating Martensite and related cracking of the rotor, improving the performance and the life of the rotor.

Moreover, rotor 100 is formed from cast iron with an improved metallurgical composition over prior art rotor 40 (FIG. 1). Prior art rotor 40 is formed of cast iron with a high carbon content, that is, a carbon content that is greater than about four (4) weight percent (%) carbon. Such a high carbon content maintains the heat transfer properties of prior art rotor 40, but creates undesirable brittleness that in turn undesirably enables rapid crack initiation and propagation in the rotor, and which reduces the rotor's hot strength. Rotor 100 is formed with a composition that maintains the heat transfer properties of disc portion 108, while reducing brittleness and improving the hot strength, by optimizing the ratio of carbon, silicon, and vanadium used to form the rotor.

More particularly, rotor 100 includes a carbon content of from about 2.80 to about 3.20 weight percent, rather than about four (4) or more percent. Such an amount of carbon maintains the hardness of rotor disc portion 108, while reducing the brittleness imparted by higher amounts of carbon and improving the rotor's hot strength. To maintain the heat transfer properties of disc portion 108, rotor 100 includes a silicon content of from about 1.80 to about 1.95 weight percent, and a vanadium content of from about 0.05 to about 0.15 weight percent. By way of example, rotor 100 preferably includes the following additional additives: manganese, from about 0.62 to about 0.80 weight percent; sulfur, a maximum of about 0.12 weight percent; phosphorous, a maximum of about 0.10 weight percent; chromium, from about 0.25 to about 0.30 weight percent; copper, from about 0.60 to about 0.75 weight percent; nickel, a maximum of about 0.05 weight percent; molybdenum, from about 0.10 to about 0.15 weight percent, titanium, a maximum of about 0.03 weight percent; aluminum, a maximum of about 0.01 weight percent; tin, a maximum of about 0.08 weight percent; and carbon equivalents, from about 3.40 to about 3.90 weight percent.

This composition of rotor 100, and particularly the carbon content, silicon content, and vanadium content, desirably maintains the heat transfer properties of the rotor, while reducing the brittleness associated with prior art high-carbon compositions. Such a reduction in brittleness desirably reduces rapid initiation and propagation of cracks in rotor 100, thereby improving the performance and life of the rotor. The composition of rotor 100 also and improves the rotor's hot strength, which further improves its performance and life. In addition, the cost associated with the above-described composition of rotor 100 is desirably more economical than that of prior art rotors.

Figure 8:
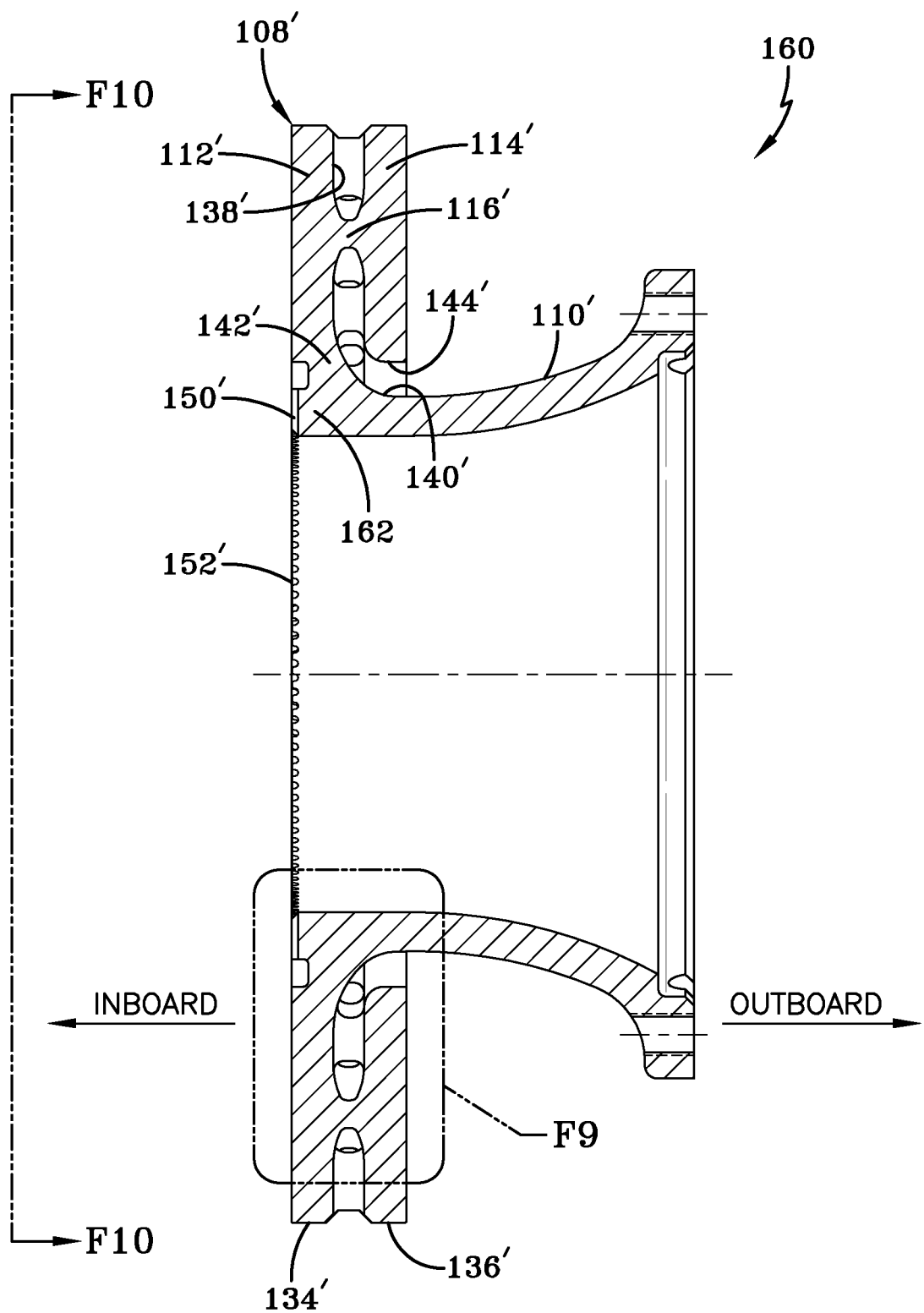
FIG. 8 is a cross-sectional view of a second exemplary embodiment of the improved disc brake rotor for heavy-duty vehicles of the present invention.
Figure 9:
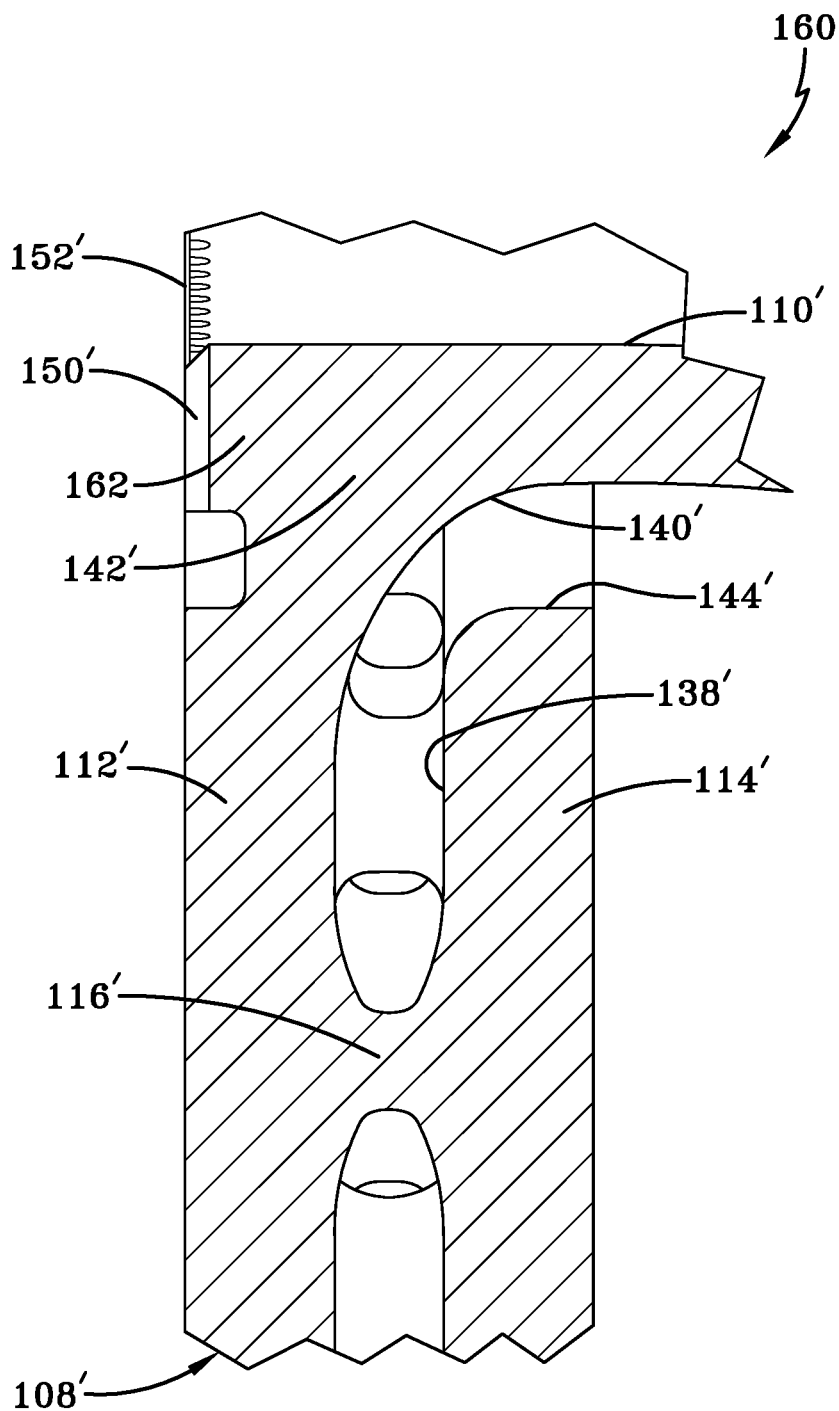
FIG. 9 is an enlarged fragmentary cross-sectional view of a portion of the improved disc brake rotor taken from the enclosed area labeled F9 in FIG. 8.
Figure 10:
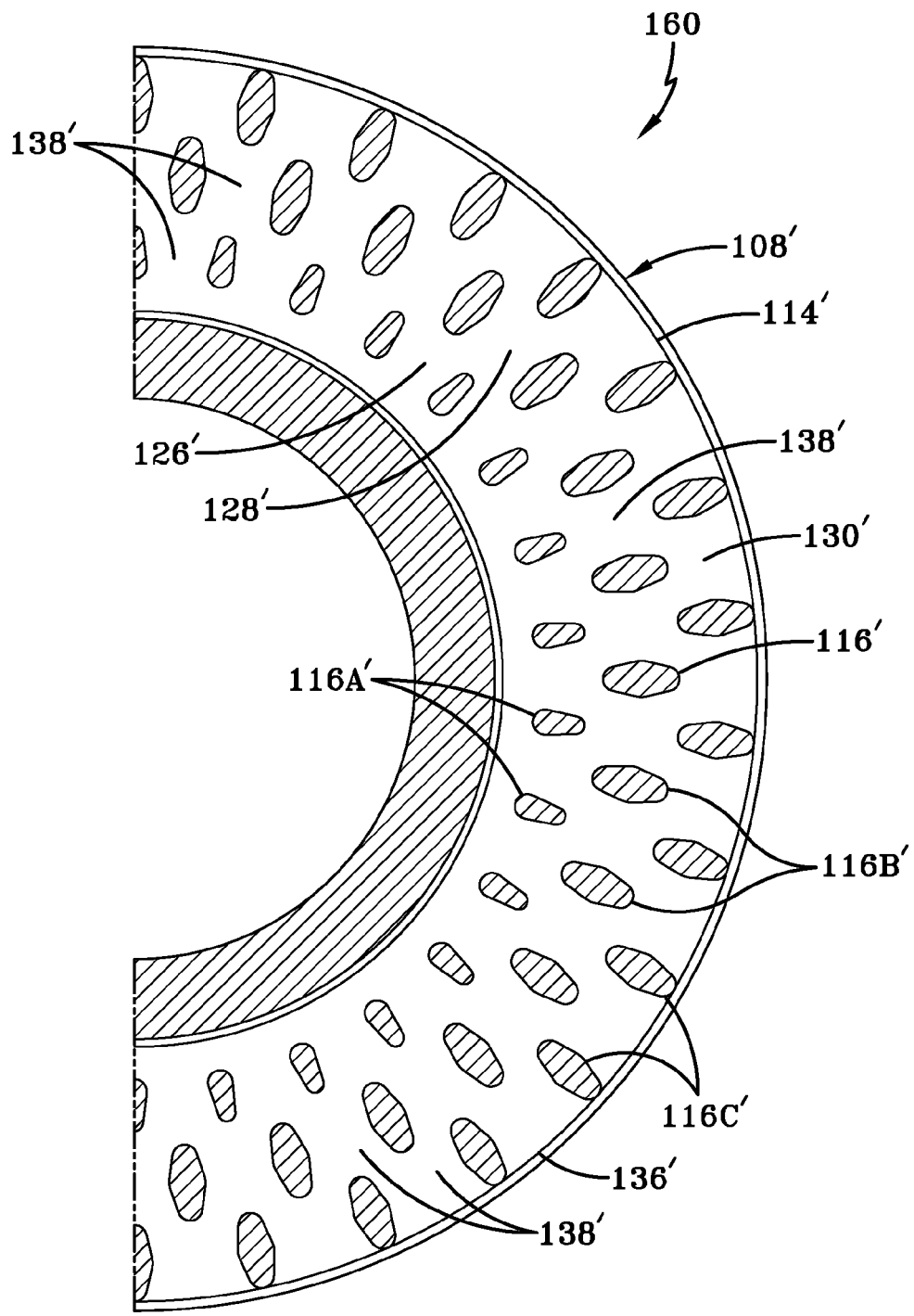
FIG. 10 is a partial cross-sectional view of a portion of the improved disc brake rotor taken along line F10-F10 in FIG. 8.

Turning now to FIGS. 8-10, a second embodiment of the improved disc brake rotor for heavy-duty vehicles of the present invention is shown and indicated generally at 160. Second embodiment rotor 160 is similar in structure and function to first embodiment rotor 100, with the exception of the tone ring structure and the pin structure. As with first embodiment rotor 100, second embodiment rotor 160 includes inboard connection 140' of rotor disc portion 108' to rotor sleeve 110' and thus to hub 22 (FIG. 1) of wheel end assembly 12, which reduces coning of the rotor during braking. Second embodiment rotor 160 also includes pins 116' that interconnect inboard disc 112' and outboard disc 114' of rotor disc portion 108', which increase air flow between the discs beyond that of prior art vane-type connections. Moreover, second embodiment rotor 160 includes an improved metallurgical composition that desirably maintains the heat transfer properties of the rotor while decreasing the brittleness of the rotor and improving the rotor's hot strength. These features cooperate to improve the resistance of rotor 160 to thermal stress created during braking, thereby increasing the performance and the life of the rotor, and also increasing the life of the brake pads (not shown). Due to such similarity of second embodiment rotor 160 to first embodiment rotor 100, only the differences between the second embodiment rotor and the first embodiment rotor will now be described.

With particular reference to FIGS. 8 and 9, rotor disc portion 108' is attached to rotor sleeve 110' by inboard connection 140'. More particularly, connection 140' includes angled connection member 142', which passes radially inside inner perimeter 144' of outboard disc 114'. Connection member 142' optionally includes an axially-extending inboard extension 162 that enables the optional integral formation of teeth 150' for a tone ring 152' of an anti-lock braking system (ABS) sensor. Inboard extension 162 accommodates convenient positioning of tone ring 152' of second embodiment rotor 160, as compared to radially inward member 148 (FIG. 4) of first embodiment rotor 100, when the second embodiment rotor is of a different size or diameter than the first embodiment rotor. The formation and/or configuration of tone ring 152' depends on particular design considerations, as rotor 160 may be formed without a tone ring, formed with a different configuration of tone ring, or formed with features to accept a discrete tone ring, as will be further described below.

Turning now to FIGS. 8 and 10, second embodiment rotor 160 includes pins 116' that interconnect inboard disc 112' and outboard disc 114' of rotor disc portion 108'. The geometry and configuration of pins 116' of second embodiment rotor 160 is different from the geometry and configuration of pins 116 (FIG. 6) of first embodiment rotor 100. By way of example, pins 116' include a combination of teardrop-shaped and generally diamond-shaped cross-sectional geometry. It is preferable for pins 116' to be arranged in bolt-style, concentric circles between inboard disc 112' and outboard disc 114'. For example, a first or radially innermost pin circle 126' preferably includes about thirty (30) pins 116A', with each pin including a teardrop-shaped cross-sectional geometry. A second pin circle 128' is disposed radially outwardly of first pin circle 126', with about thirty (30) pins 116B' being circumferentially offset from respective pins 116A' of the first pin circle, and each pin including an elongated diamond-shaped cross-sectional geometry. A third pin circle 130' is disposed radially outwardly of second pin circle 128', with about thirty (30) pins 116C' being circumferentially offset from respective pins 116B' of the second pin circle, and circumferentially aligned with respective pins 116A' of first pin circle 126'. Third pin circle 130' is disposed adjacent perimeter 134' of inboard disc 112' and perimeter 136' of outboard disc 114', with each pin including a rounded diamond-shaped cross-sectional geometry.

It is to be understood that pins 116' can be any radially broken structure, and other geometric configurations, sizes, and patterns of the pins may be employed without affecting the overall concept or operation of the invention, such as wedges, circles, ovals, and the like. In this manner, pins 116' provide a rigid connection between inboard disc 112' and outboard disc 114', while forming a significant amount of air space or air passages 138' between the inboard and outboard discs, which enables air flow, including lateral air flow, between the discs.

Second embodiment rotor 160, by employing pins 116', increases air flow through rotor disc portion 108', which dissipates heat and reduces thermal loading of the disc portion.

Reduction of thermal loading of rotor disc portion 108' reduces potential cracking of rotor 160, thereby improving the performance and the life of the rotor. In addition, pins 116' create a discontinuous radial connection between inboard disc 112' and outboard disc 114', compared to continuously connected radially-extending vanes 58 of the prior art. In the event a crack forms on inboard disc 112' and/or outboard disc 114', the discontinuous radial connection created by pins 116' acts to prevent propagation of the crack, thereby further improving the performance and the life of rotor 160.

Figure 11:
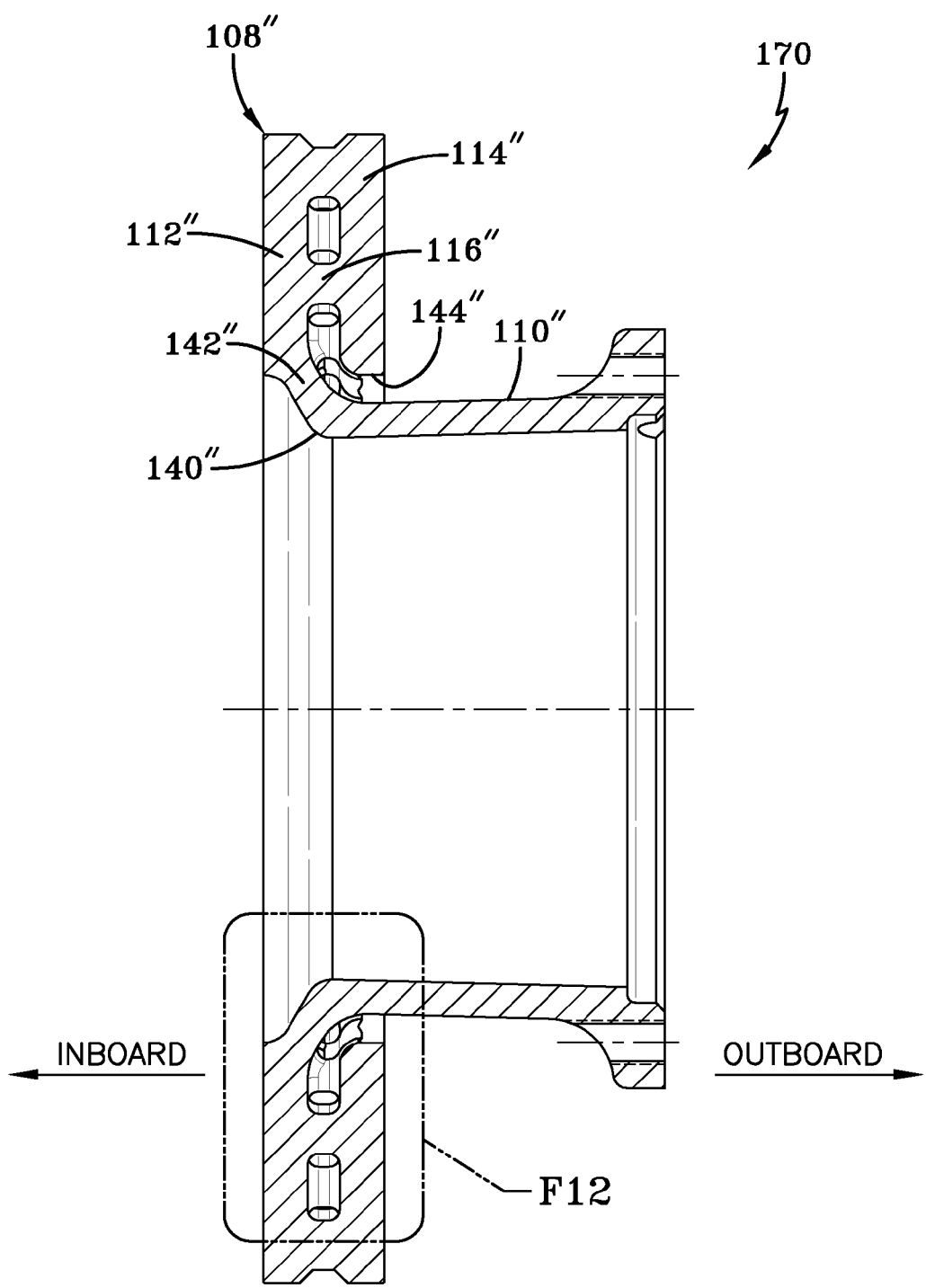
FIG. 11 is a cross-sectional view of a third exemplary embodiment of the improved disc brake rotor for heavy-duty vehicles of the present invention.
Figure 12:
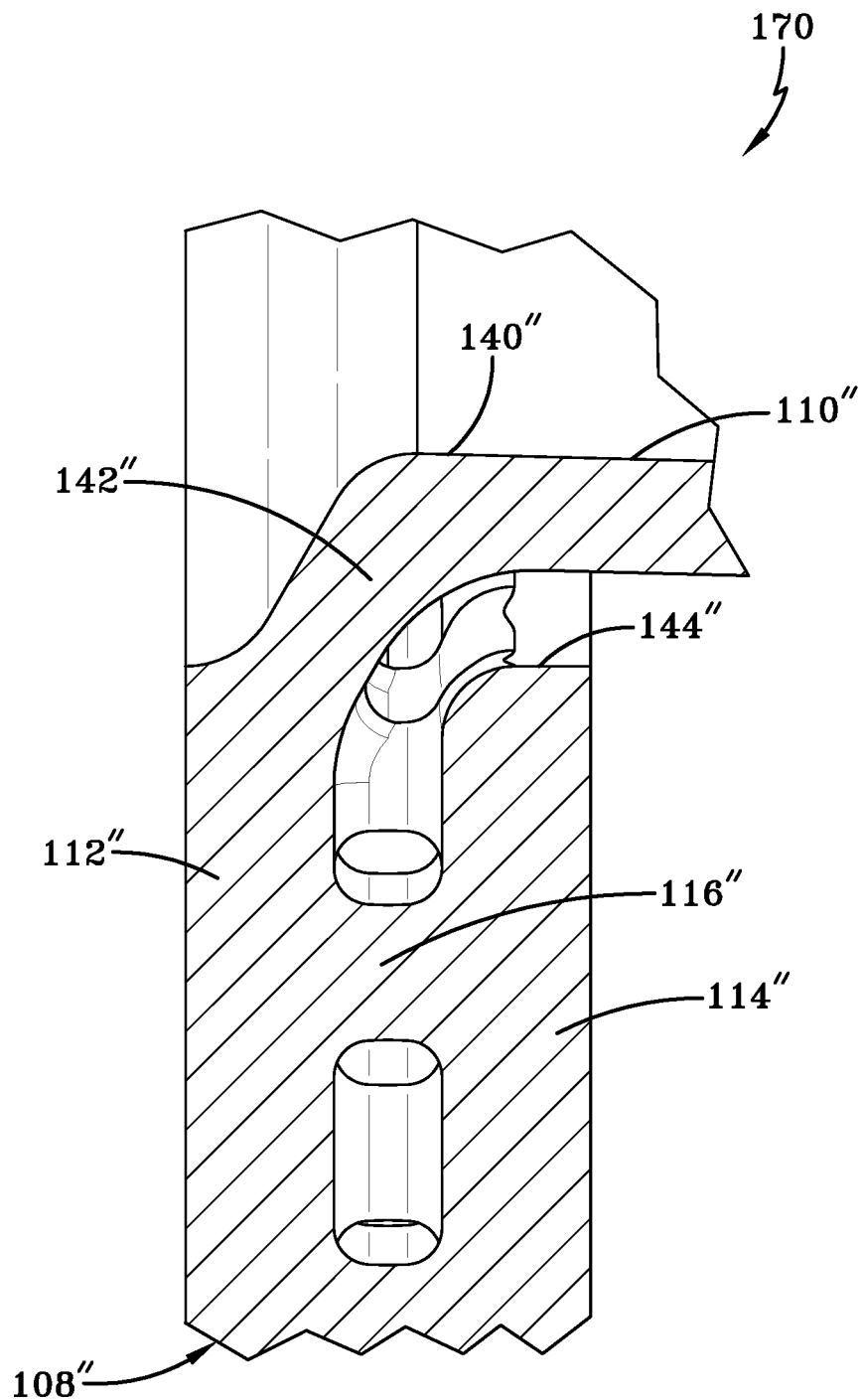
FIG. 12 is an enlarged fragmentary cross-sectional view of a portion of the improved disc brake rotor taken from the enclosed area labeled F12 in FIG. 11.

Referring now to FIGS. 11 and 12, a third embodiment of the improved disc brake rotor for heavy-duty vehicles of the present invention is shown and indicated generally at 170. Third embodiment rotor 170 is similar in structure and function to first embodiment rotor 100, with the exception that the third embodiment does not include an integrated tone ring structure. As with first embodiment rotor 100, third embodiment rotor 170 includes inboard connection 140" of rotor disc portion 108" to rotor sleeve 110" and thus to hub 22 (FIG. 1) of wheel end assembly 12, which reduces coning of the rotor during braking. Third embodiment rotor 170 also includes pins 116" that interconnect inboard disc 112" and outboard disc 114" of rotor disc portion 108", which increase air flow between the discs beyond that of prior art vane-type connections. Moreover, third embodiment rotor 170 includes an improved metallurgical composition that desirably maintains the heat transfer properties of the rotor while decreasing the brittleness of the rotor and improving the rotor's hot strength. These features cooperate to improve the resistance of rotor 170 to thermal stress created during braking, thereby increasing the performance and the life of the rotor, and also increasing the life of the brake pads (not shown). Due to such similarity of third embodiment rotor 170 to first embodiment rotor 100, only the differences between the third embodiment rotor and the first embodiment rotor will now be described.

Rotor disc portion 108" is attached to rotor sleeve 110" by inboard connection 140". More particularly, connection 140" includes angled connection member 142", which passes radially inside inner perimeter 144" of outboard disc 114". In contrast to first embodiment rotor 100, third embodiment rotor 170 lacks radially inward member 148 (FIG. 4) of first embodiment rotor 100. More particularly, third embodiment rotor 170 does not provide for integral formation of teeth 150 (FIG. 4) for a tone ring 152 of an anti-lock braking system (ABS) sensor. Rather, third embodiment rotor 170 is employed when particular design considerations dictate the use of a tone ring (not shown) that is separately attached to the rotor or to wheel hub 22 (FIG. 1), or is machined into the wheel hub. Use of a discrete tone ring reduces corrosion issues in particular circumstances, and enables the tone ring to be removed for servicing, which may be desirable in certain applications.

Turning now to FIGS. 13-20, a fourth embodiment of the improved disc brake rotor for heavy-duty vehicles of the present invention is shown and indicated generally at 220. Fourth embodiment rotor 220 is similar in structure and function to first embodiment rotor 100, with the exception of the tone ring structure. As with first embodiment rotor 100, fourth embodiment rotor 220 includes inboard connection 140''' of rotor disc portion 108''' to rotor sleeve 110''' and thus to hub 22 (FIG. 1) of wheel end assembly 12, which reduces coning of the rotor during braking. Fourth embodiment rotor 220 also includes pins 116''' that interconnect inboard disc 112''' and outboard disc 114''' of rotor disc portion 108''', which increase air flow between the discs beyond that of prior art vane-type connections. Moreover, fourth embodiment rotor 220 includes an improved metallurgical composition that desirably maintains the heat transfer properties of the rotor while decreasing the brittleness of the rotor and improving the rotor's hot strength. These features cooperate to improve the resistance of rotor 220 to thermal stress created during braking, thereby increasing the performance and the life of the rotor, and also increasing the life of the brake pads (not shown). Due to such similarity of fourth embodiment rotor 220 to first embodiment rotor 100, only the differences between the fourth embodiment rotor and the first embodiment rotor will now be described.

Figure 13:
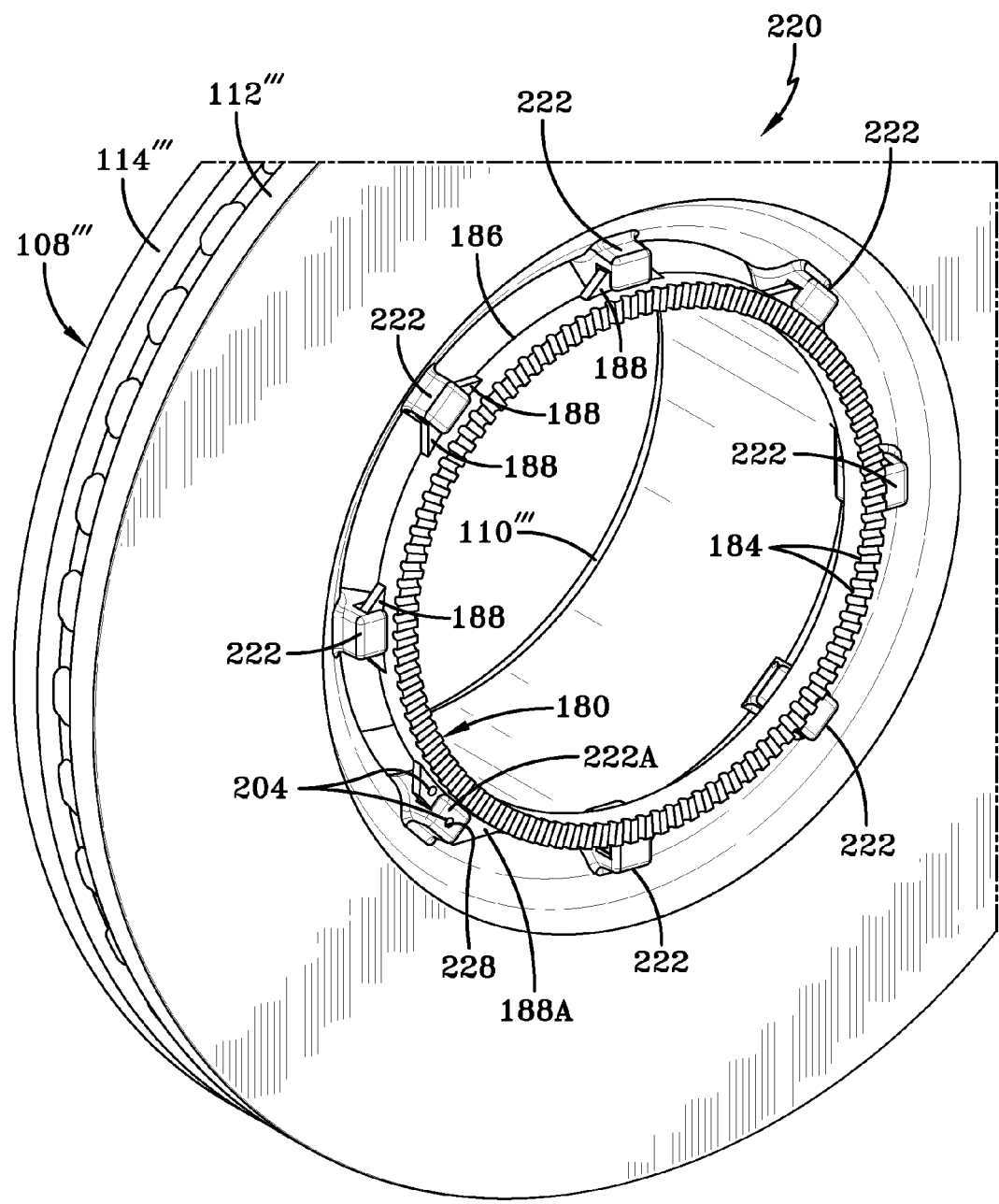
FIG. 13 is a fragmentary inboard perspective view of a fourth exemplary embodiment of the improved disc brake rotor for heavy-duty vehicles of the present invention, shown with a discrete tone ring mounted thereon.
Figure 14:
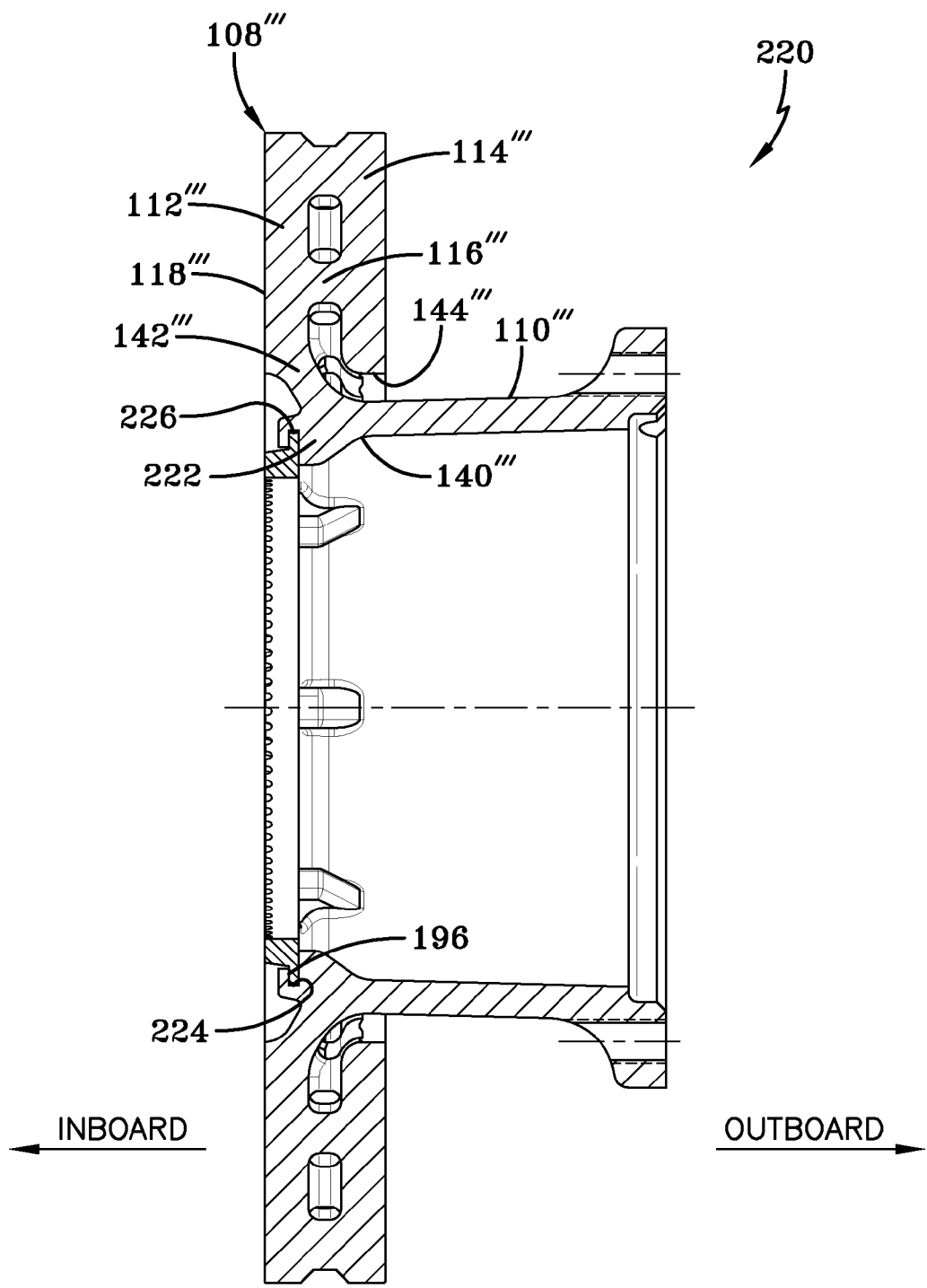
FIG. 14 is a cross-sectional view of the improved disc brake rotor shown in FIG. 13.

With particular reference to FIGS. 13 and 14, rotor disc portion 108''' is attached to rotor sleeve 110''' by inboard connection 140'''. More particularly, connection 140''' includes angled connection member 142''', which passes radially inside inner perimeter 144''' of outboard disc 114'''. In contrast to first embodiment rotor 100, fourth embodiment rotor 220 lacks radially inward member 148 (FIG. 4) of first embodiment rotor 100. More particularly, fourth embodiment rotor 220 does not provide for integral formation of teeth 150 (FIG. 4) for a tone ring 152 of an anti-lock braking system (ABS) sensor. Rather, fourth embodiment rotor 220 is fowled with a plurality of lugs 222 that receive a discrete tone ring 180.

Lugs 222 are formed on and extend radially inwardly from angled connection member 142'''. At least four lugs 222, and preferably eight lugs, are formed on angled connection member 142''', and are uniformly spaced apart about the circumference of rotor 220. Each lug 222 is formed with a circumferentially-extending groove 224 on its radially inner surface 226 to enable each lug to receive and capture tone ring 180. At least one selected lug 222A is formed with an axial opening 228, to be described in greater detail below.

Figure 15:
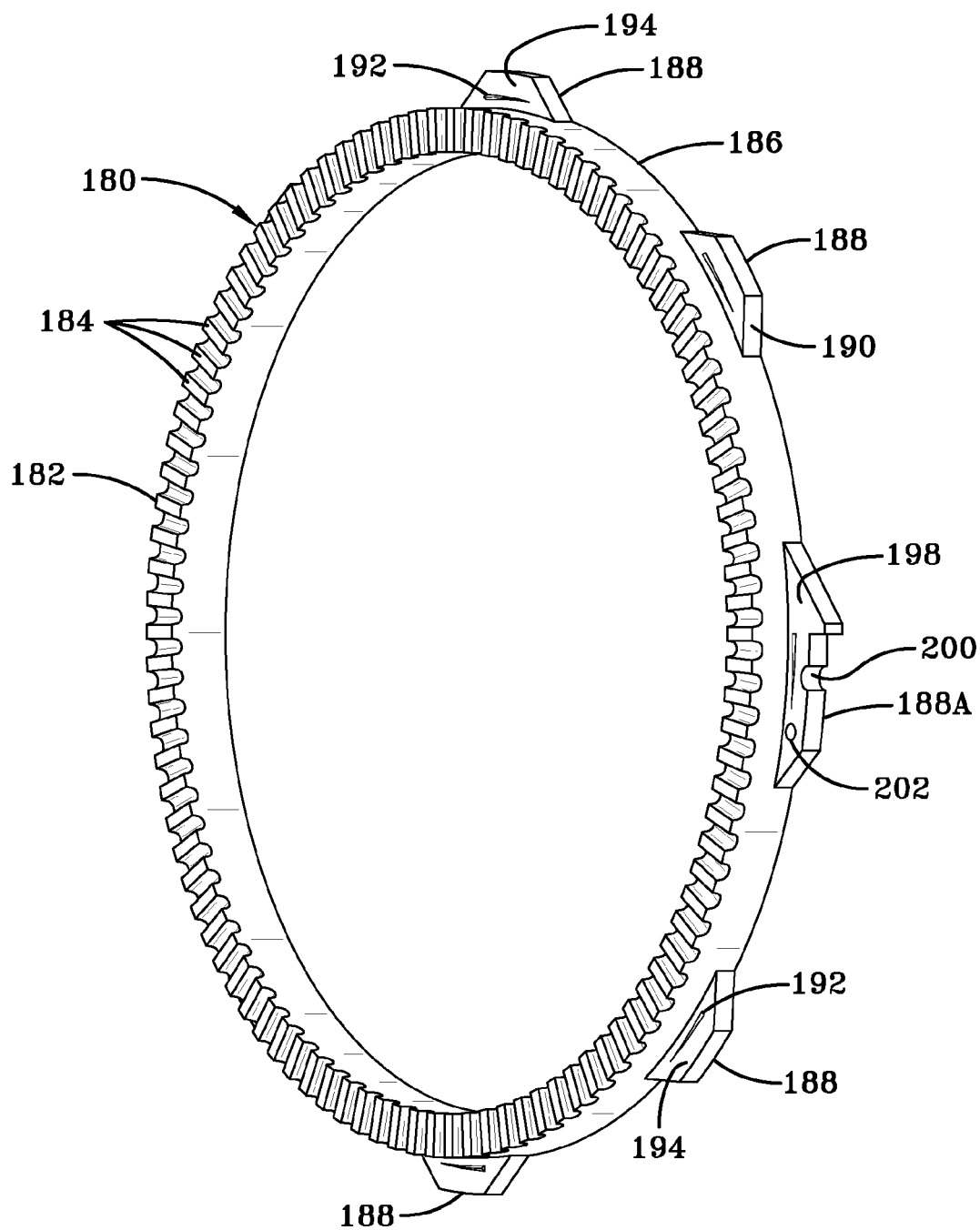
FIG. 15 is a perspective view of the tone ring shown in FIG. 13.
Figure 16:
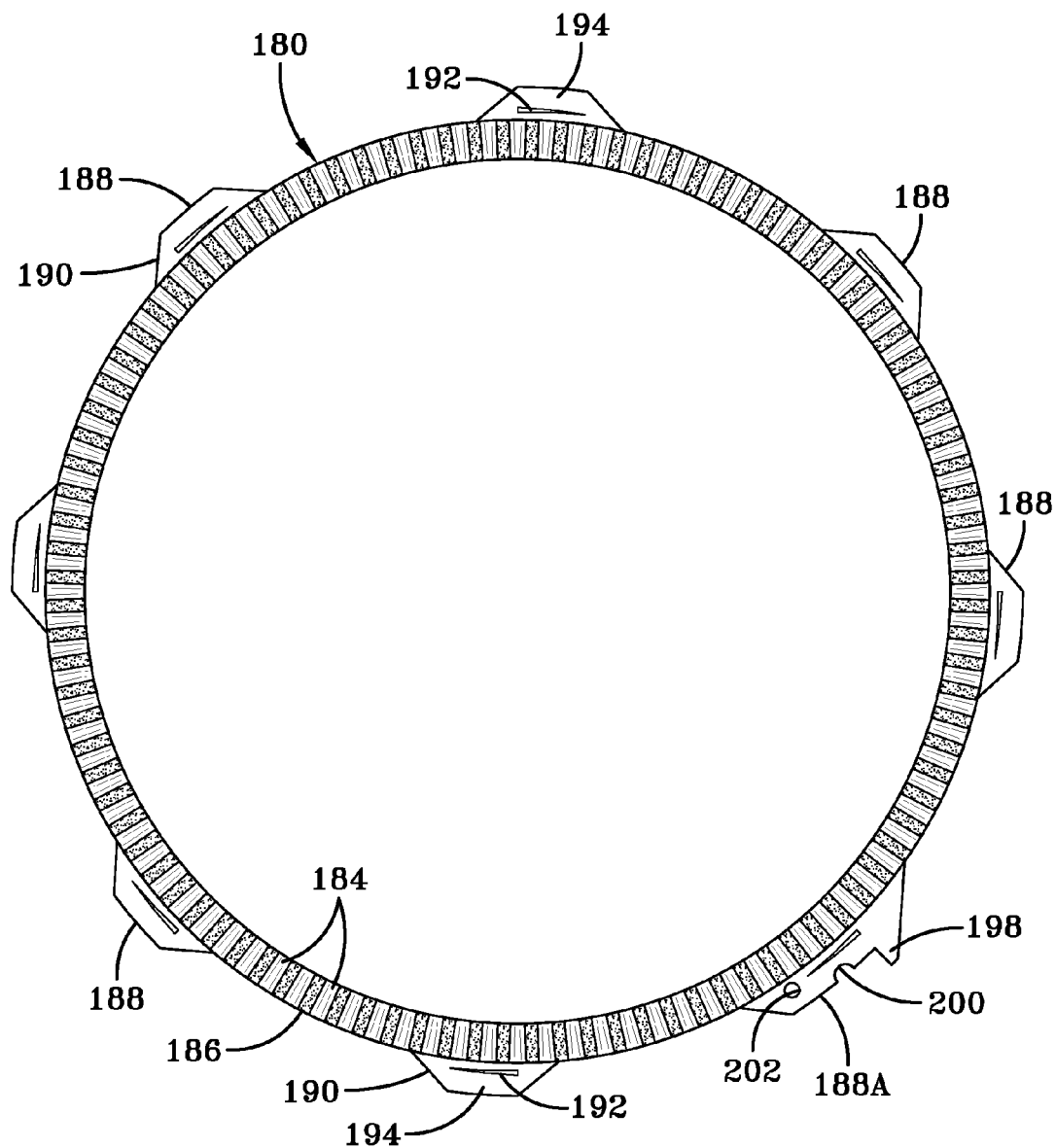
FIG. 16 is an inboard end elevational view of the tone ring shown in FIG. 15.

Turning now to FIGS. 15 and 16, tone ring 180 includes an inboard surface 182, upon which tone ring teeth 184 are formed, and an outer perimeter 186, on which a plurality of bosses 188 are formed. At least four bosses 188, and preferably eight bosses, are formed on tone ring 180, and are uniformly spaced apart about the circumference of the tone ring to correspond to respective lugs 222. Each boss 188 is received by a respective one of rotor lugs 222 to secure tone ring 180 to rotor 220. With additional reference to FIG. 13, tone ring 180 is mounted on rotor 220 by placing the tone ring adjacent rotor inboard disc 112''', with each tone ring boss 188 circumferentially adjacent a corresponding rotor lug 222. Tone ring 180 is then rotated until each respective boss 188 is seated in a corresponding lug groove 224. To provide easy insertion into lug grooves 224, each respective boss 188 is formed with angled sidewalls 190.

Each boss 188 includes a sacrificial spacer or shim 192 formed on an inboard surface 194 of the boss. Once each boss 188 is seated in a respective lug 222, sacrificial shim 192 compresses to fill in any space between the boss and walls 196 of the lug, thereby wedging tone ring 180 in each lug groove 224 and reducing axial movement of the tone ring.

To prevent unintentional rotation of tone ring 180, a selected one of bosses 188A is formed with a radially-extending shoulder 198, a circumferentially-shaped cutout 200, and an opening 202. Selected boss 188A aligns with selected lug 222A and cooperates with the lug to prevent rotation of tone ring 180.

Figure 17:
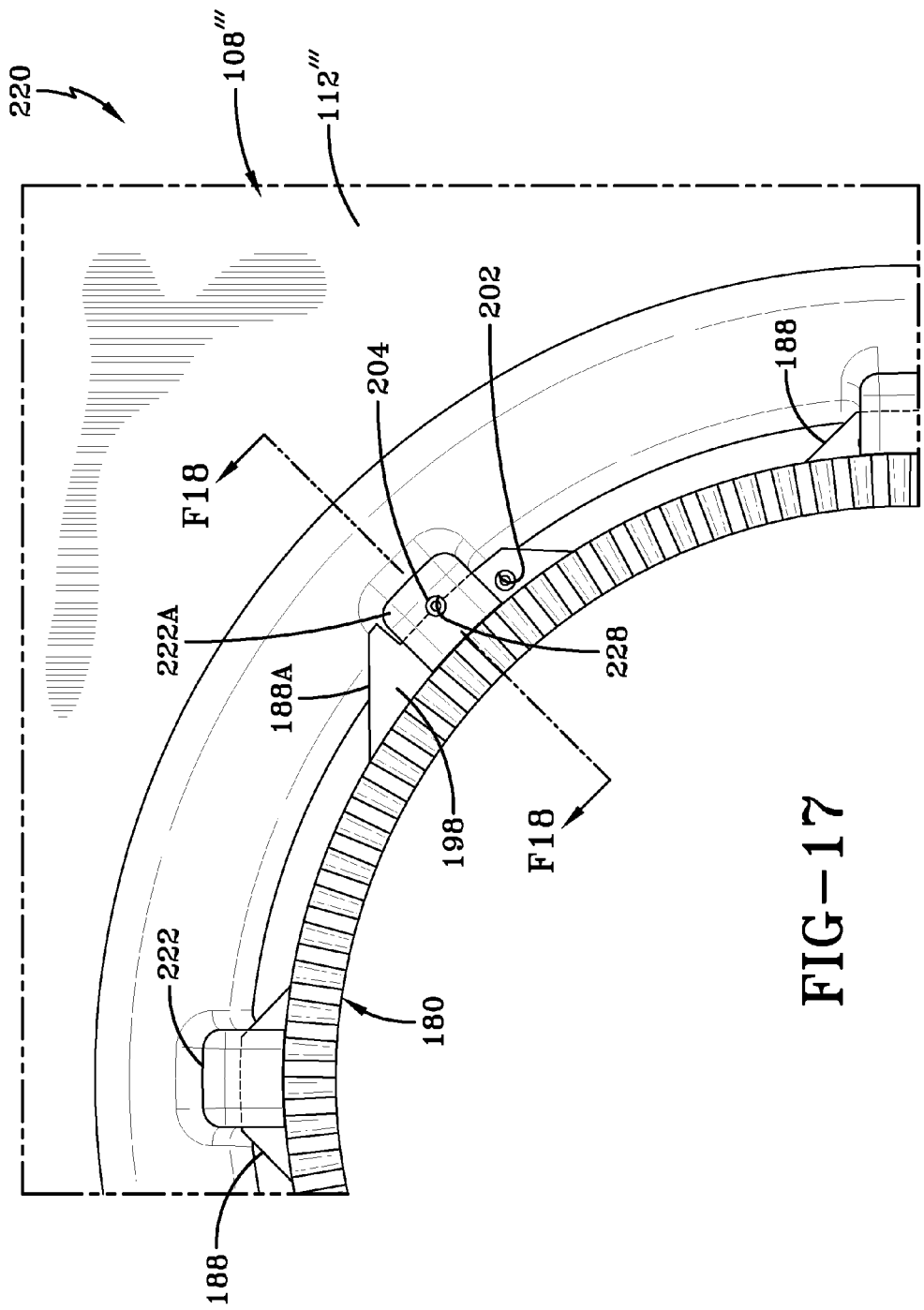
FIG. 17 is a fragmentary inboard end elevational view showing one form of securing the tone ring and brake rotor shown in FIG. 13.
Figure 18:
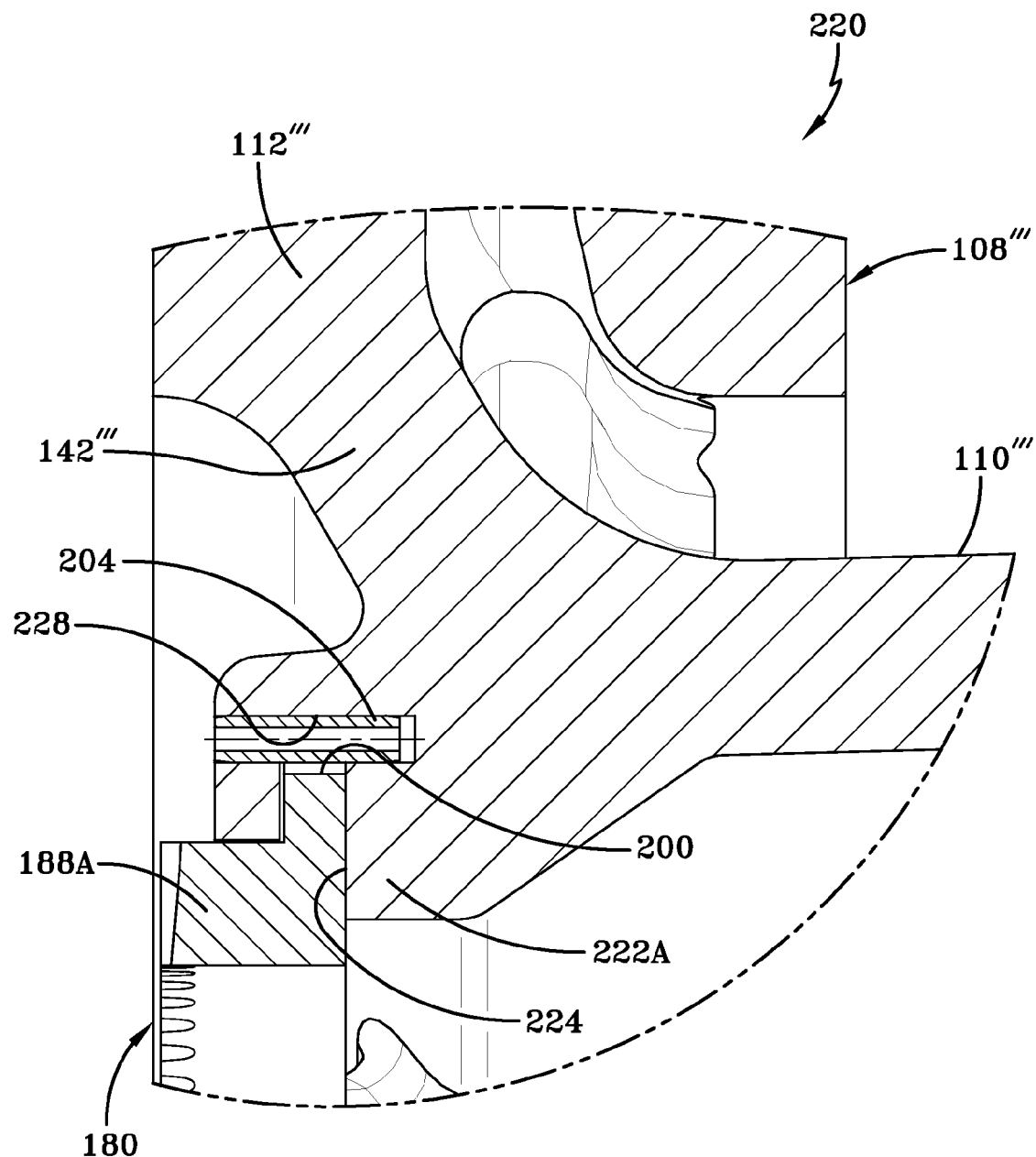
FIG. 18 is a fragmentary cross-sectional view of a portion of the tone ring and brake rotor taken along line F18-F18 in FIG. 17.

More particularly, with reference now to FIGS. 17 and 18, when tone ring 180 is rotated until each respective boss 188 is seated in a corresponding lug groove 224, shoulder 198 of selected boss 188A abuts selected lug 222A to stop rotation of the tone ring in a first direction. By way of example, this will be referred to as a clockwise direction. To prevent rotation of tone ring 180 in a counterclockwise direction, circumferentially-shaped cutout 200 formed in selected boss 188A axially aligns with opening 228 formed in selected lug 222A. A fastener 204, such as a roll pin, is received in aligned cutout 200 and opening 228. In this manner, boss shoulder 198, lug 222A, boss cutout 200, lug opening 228, and roll pin 204 cooperate to prevent excessive rotation of tone ring 180 relative to rotor 220, which in turn prevents unintentional rotation of the tone ring that may cause the tone ring to unseat from the rotor.

Figure 19:
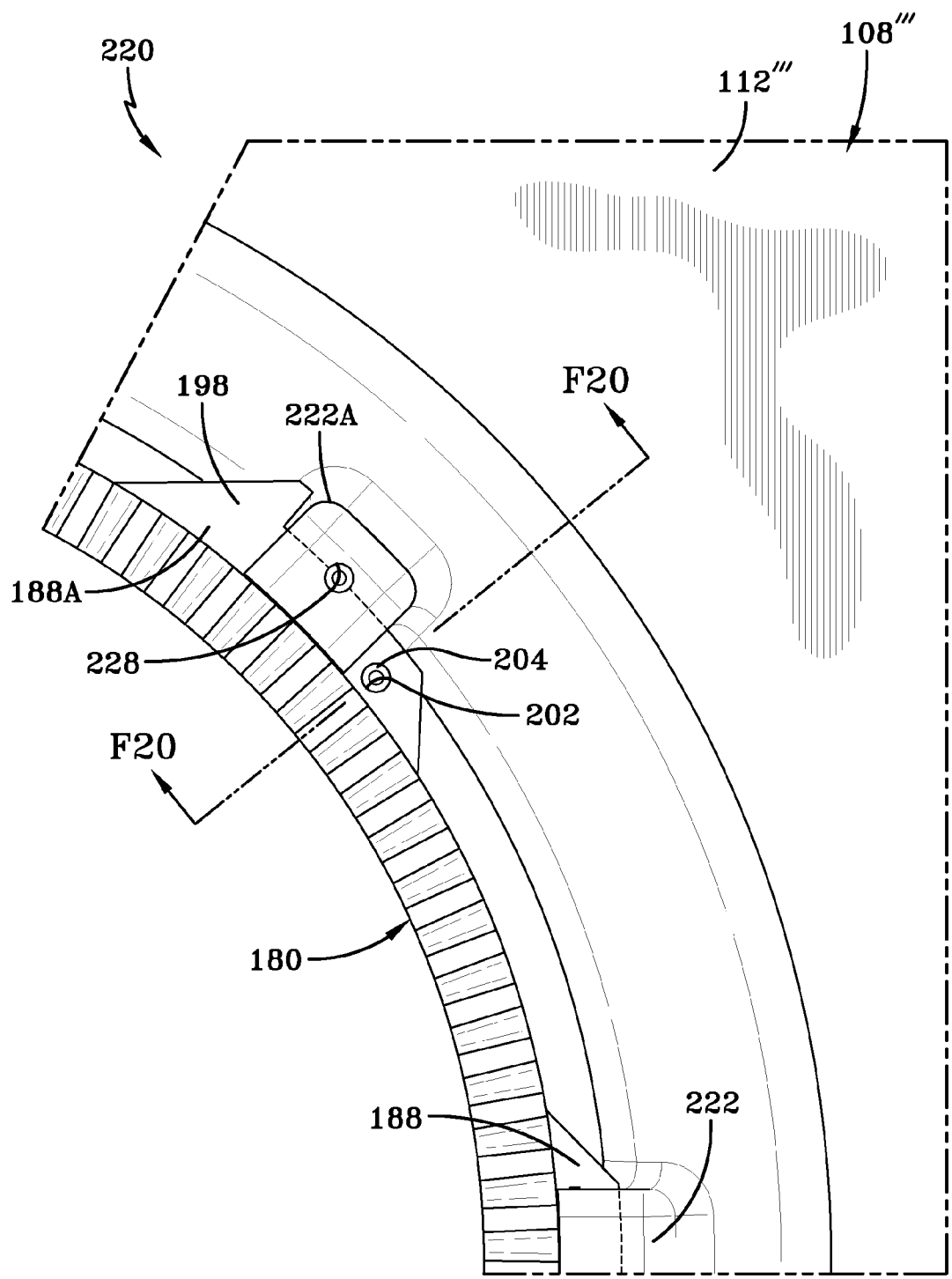
FIG. 19 is a fragmentary inboard end elevational view showing another form of securing the tone ring and brake rotor shown in FIG. 13.
Figure 20:
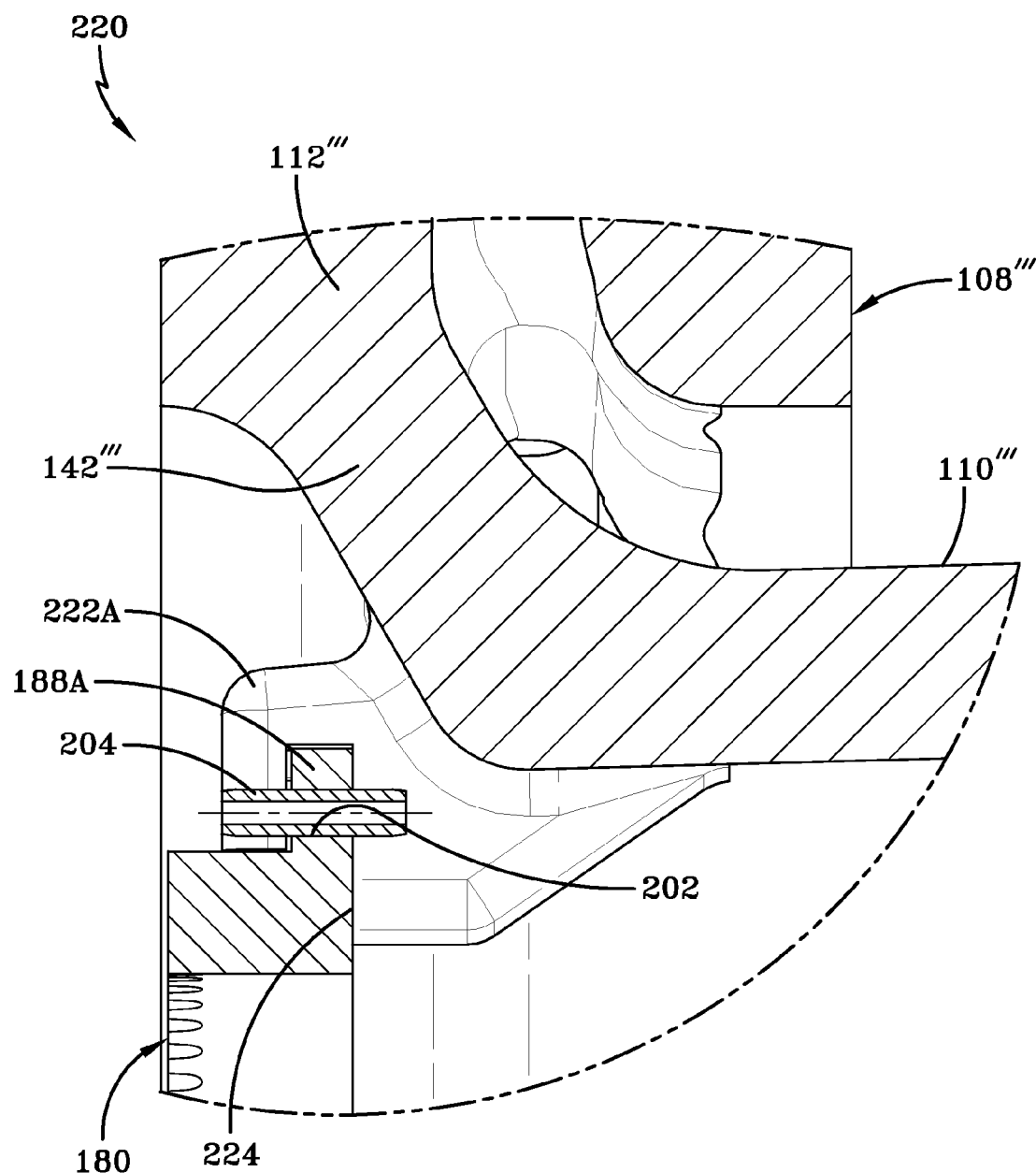
FIG. 20 is a fragmentary cross-sectional view of a portion of the tone ring and brake rotor taken along line F20-F20 in FIG. 19.

Alternatively, turning to FIGS. 19 and 20, when tone ring 180 is rotated until each respective boss 188 is seated in a corresponding lug groove 224, shoulder 198 of selected boss 188A abuts selected lug 222A to stop rotation of the tone ring in a first direction. By way of example, this will be referred to as a clockwise direction. To prevent rotation of tone ring 180 in a counterclockwise direction, opening 202 formed in selected boss 188A is disposed adjacent an opposite side of lug 222A from shoulder 198. Fastener 204, such as a roll pin, is received in boss opening 202. In this manner, boss shoulder 198, lug 222A, boss opening 202, and roll pin 204 cooperate to prevent excessive rotation of tone ring 180 relative to rotor 220, which in turn prevents unintentional rotation of the tone ring that may cause the tone ring to unseat from the rotor.

As an additional alternative, a fastener such as roll pin 204 may be inserted in each one of boss opening 202, and aligned boss cutout 200 and lug opening 228, as shown in FIG. 13. Preferably, tone ring 180 is formed of powdered metal. Alternatively, tone ring 180 may be cast of stamped from a metal alloy. If tone ring 180 is stamped from a metal alloy, a further alternative rotational stop may be formed on the tone ring. More particularly, selected boss 188A, rather than being formed with opening 202, may be formed with a tab (not shown) that is bent in an axial direction to abut the opposite side of lug 222A from shoulder 198, thereby preventing rotation of tone ring 180 relative to rotor 220.

Fourth embodiment rotor 220 thus may be formed to accept a discrete tone ring 180, which may be formed of a different material than the rotor. Use of a discrete tone ring 180 reduces corrosion issues in particular circumstances, enables the tone ring to be removed for servicing, and desirably reduces weight when compared to integrally-formed tone ring 152 (FIG. 4).

In this manner, the construction and arrangement of the improved disc brake rotor 100, 160, 170, 220 for heavy-duty vehicles of the present invention provides an inboard connection 140, 140', 140'', 140''' of disc portion 108, 108', 108'', 108'41 to sleeve 110, 110', 110'', 110''', which reduces or eliminates coning of the disc portion due to the heat from braking. Such a reduction or an elimination of coning optimizes the efficiency of the brake system, and desirably reduces the stress at each point of contact between the brake pads and each respective inboard disc 112, 112', 112'', 112''' and outboard disc 114, 114', 114'', 114'''. This reduction of stress decreases the formation of cracks in rotor disc portion 108, 108', 108'', 108''', and increases the life of the brake pads. In addition, rotor 100, 160, 170, 220 employs pins 116, 116', 116'', 116''' to increase air flow through rotor disc portion 108, 108', 108'', 108''', which dissipates heat and reduces thermal loading of the disc portion. Such reduction of thermal loading of rotor disc portion 108, 108', 108'', 108''' reduces the tendency of cracks to form in rotor 100, 160, 170, 220.

Moreover, rotor 100, 160, 170, 220 includes an improved metallurgical composition that desirably maintains the heat transfer properties of the rotor while decreasing the brittleness of the rotor, which reduces initiation and rapid propagation of cracks in the rotor. These features cooperate to improve the resistance of rotor 100, 160, 170, 220 to thermal stress created during braking, thereby desirably increasing the performance and the life of the rotor. The composition of rotor 100, 160, 170, 220 also and improves the rotor's hot strength, which further improves the performance and life of the rotor.

In addition, rotor 100, 160, 170, 220, by employing inboard connection 140, 140', 140'', 140''', finds an additional advantage in air disk brake applications. The inboard connection 140, 140', 140'', 140''' of rotor 100, 160, 170, 220 creates a cooling displacement in the inboard direction, which creates a running clearance between outboard surface 124, 124', 124'', 124''' of outboard disc 114, 114', 114'', 114''' and its respective brake pad, thereby creating an easier release of the outboard brake pad from the outboard disc in air disk brake applications, which increases the life of the brake pad. Moreover, inboard connection 140, 140', 140'', 140''' of rotor 100, 160, 170, 220 and its cooling displacement, in combination with the improved air flow enabled by pins 116, 116', 116'', 116''' desirably increase the rate at which outboard surface 124, 124', 124'', 124''' of outboard disc 114, 114', 114'', 114''' disengages its respective outboard brake pad, thereby reducing light high-speed drag and the probability of creating Martensite and related cracking of the rotor, improving the performance and the life of the rotor.

Fourth embodiment rotor 220 is formed with a configuration to receive a discrete tone ring 180. Rotor includes a plurality of lugs 222 that each have a groove 224 to receive and capture respective bosses 188 formed on tone ring 180. Bosses 188 are each fanned with a sacrificial spacer or shim 192 to prevent axial movement of tone ring 180 relative to rotor 220, and at least one lug 222A and a respective boss 118A are formed with mating features to prevent rotational movement of the tone ring relative to the rotor.

The present invention also includes a method of making and a method of using an improved disc brake rotor for heavy-duty vehicles 100, 160, 170, 220. The method includes steps in accordance with the description that is presented above and shown in FIGS. 2-20.

It is to be understood that the structure and arrangement of the above-described improved disc brake rotor 100, 160, 170, 220 for heavy-duty vehicles of the present invention may be altered or rearranged without affecting the overall concept or operation of the invention. In addition, the improved disc brake rotor 100, 160, 170, 220 for heavy-duty vehicles of the present invention may be employed with other types of axles, wheel end assemblies, axle/suspension systems, and/or brake systems than those shown and described above, without affecting the overall concept or operation of the invention. Moreover, while reference herein has been made generally to a heavy-duty vehicle for the purpose of convenience, it has been with the understanding that such reference includes trucks, tractor-trailers and semi-trailers, and trailers thereof.

Accordingly, the improved disc brake rotor for heavy-duty vehicles of the present invention is simplified, provides an effective, safe, inexpensive, and efficient structure which achieves all the enumerated objectives, provides for eliminating difficulties encountered with prior art disc brake rotors, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved disc brake rotor for heavy-duty vehicles of the present invention is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A disc brake rotor for heavy-duty vehicles, said rotor comprising:
   a disc portion, said disc portion including:
      an inboard disc;
      an outboard disc, said outboard disc being spaced apart from said inboard disc;
      a plurality of pins extending between and rigidly connecting said inboard disc and said outboard disc;
      a carbon content of from about 2.80 weight percent to about 3.20 weight percent carbon, a silicon content of from about 1.80 weight percent to about 1.95 weight percent silicon, and a vanadium content of from about 0.05 weight percent to about 0.15 weight percent vanadium;
   a sleeve, said sleeve including an inboard end and an outboard end, and being disposed inside an inner perimeter of said outboard disc; and
   a connecting member, said connecting member extending between and rigidly connecting an inner perimeter of said inboard disc to said inboard end of said sleeve, whereby said rotor provides improved resistance to thermal stress that is created during braking.

2. The disc brake rotor for heavy-duty vehicles of claim 1, wherein said plurality of pins includes individual pins arranged in concentric circles, said circles extending radially outwardly from an inner perimeter of said inboard and outboard discs to an outer perimeter of the inboard and outboard discs.

3. The disc brake rotor for heavy-duty vehicles of claim 1, wherein said plurality of pins includes a cross section including at least one of round, wedge, tear drop, oval, diamond, and elliptical shapes.

4. The disc brake rotor for heavy-duty vehicles of claim 1, wherein said connecting member includes a further member that is formed with integral tone ring teeth.

5. The disc brake rotor for heavy-duty vehicles of claim 1, wherein said connecting member is formed with a plurality of circumferentially-spaced lugs, said lugs capturing a discrete tone ring.

6. The disc brake rotor for heavy-duty vehicles of claim 5, wherein each one of said lugs is formed with a groove, and said tone ring is formed with bosses, whereby each one of said bosses is received in a respective one of said grooves.

7. The disc brake rotor for heavy-duty vehicles of claim 6, wherein at least one of said bosses is formed with an integral shim.

8. The disc brake rotor for heavy-duty vehicles of claim 6, wherein at least one of said lugs is formed with an opening, and at least one of said bosses is formed with an opening, whereby said lug opening and said boss opening align and receive a fastener to secure a position of said tone ring.

9. The disc brake rotor for heavy-duty vehicles of claim 6, wherein at least one of said bosses is formed with an opening, whereby said boss opening receives a fastener to secure a position of said tone ring.

10. The disc brake rotor for heavy-duty vehicles of claim 6, wherein at least one of said bosses is formed with a tab, said tab capable of being bent to abut a selected one of said lugs to secure a position of said tone ring.

11. The disc brake rotor for heavy-duty vehicles of claim 1, wherein said rotor sleeve outboard end is formed with a mounting flange to enable rigid attachment of said rotor to a wheel hub.

12. The disc brake rotor for heavy-duty vehicles of claim 1, wherein said disc brake rotor is included in an air disc brake assembly.

13. A tone ring attachment for a disc brake rotor for heavy-duty vehicles, said tone ring attachment comprising:
   a disc brake rotor, said rotor including a disc portion;
   said disc portion being formed with a plurality of circumferentially-spaced lugs, each one of said lugs being formed with a groove;
   a tone ring, said tone ring being formed with a plurality of bosses, wherein each one of said bosses is received in a respective one of said lug grooves;
   at least one of said bosses being formed with an integral shim; and
   means for securing a position of said tone ring to prevent the tone ring from rotating relative to said disc portion.

14. The tone ring attachment for a disc brake rotor for heavy-duty vehicles of claim 13, wherein said means for securing a position of said tone ring includes an opening formed in at least one of said lugs and an opening formed in at least one of said bosses, whereby said lug opening and said boss opening align and receive a fastener to secure said tone ring position.

15. The tone ring attachment for a disc brake rotor for heavy-duty vehicles of claim 13, wherein said means for securing a position of said tone ring includes an opening formed in at least one of said bosses, whereby said boss opening receives a fastener to secure said tone ring position.

16. The tone ring attachment for a disc brake rotor for heavy-duty vehicles of claim 13, wherein said means for securing a position of said tone ring includes a tab formed on at least one of said bosses, and said tab is capable of being bent to abut a selected one of said lugs to secure said tone ring position.

17. A disc brake rotor for heavy-duty vehicles, said rotor comprising:
 a disc portion, said disc portion including:
  an inboard disc;
  an outboard disc, said outboard disc being spaced apart from said inboard disc;
  a plurality of pins extending between and rigidly connecting said inboard disc and said outboard disc;
  a carbon content of from about 2.80 weight percent to about 3.20 weight percent carbon, a silicon content of from about 1.80 weight percent to about 1.95 weight percent silicon, and a vanadium content of from about 0.05 weight percent to about 0.15 weight percent vanadium;
 a sleeve, said sleeve including an inboard end and an outboard end, and being disposed inside an inner perimeter of said outboard disc; and
 a connecting member, said connecting member extending between and rigidly connecting an inner perimeter of said inboard disc to said inboard end of said sleeve.

18. A disc brake rotor for heavy-duty vehicles, said rotor comprising:
 a disc portion, said disc portion including:
  an inboard disc;
  an outboard disc, said outboard disc being spaced apart from said inboard disc;
  a plurality of pins extending between and rigidly connecting said inboard disc and said outboard disc;
 a sleeve, said sleeve including an inboard end and an outboard end, and being disposed inside an inner perimeter of said outboard disc; and
 a connecting member, said connecting member extending between and rigidly connecting an inner perimeter of said inboard disc to said inboard end of said sleeve, the connecting member being formed with a plurality of circumferentially-spaced lugs, said lugs capturing a discrete tone ring.

19. The disc brake rotor for heavy-duty vehicles of claim 18, wherein each one of said lugs is formed with a groove, and said tone ring is formed with bosses, whereby each one of said bosses is received in a respective one of said grooves.

20. The disc brake rotor for heavy-duty vehicles of claim 19, wherein at least one of said bosses is formed with an integral shim.

21. The disc brake rotor for heavy-duty vehicles of claim 19, wherein at least one of said lugs is formed with an opening, and at least one of said bosses is formed with an opening, whereby said lug opening and said boss opening align and receive a fastener to secure a position of said tone ring.

22. The disc brake rotor for heavy-duty vehicles of claim 19, wherein at least one of said bosses is formed with an opening, whereby said boss opening receives a fastener to secure a position of said tone ring.

23. The disc brake rotor for heavy-duty vehicles of claim 19, wherein at least one of said bosses is formed with a tab, said tab capable of being bent to abut a selected one of said lugs to secure a position of said tone ring.

24. A disc brake rotor for heavy-duty vehicles, said rotor comprising:
 a disc portion, said disc portion including:
  an inboard disc;
  an outboard disc, said outboard disc being spaced apart from said inboard disc;
  a plurality of pins extending between and rigidly connecting said inboard disc and said out board disc;
 a sleeve, said sleeve including an inboard end and an outboard end, and being disposed inside an inner perimeter of said outboard disc; and
 a connecting member, said connecting member extending between and rigidly connecting an inner perimeter of said inboard disc to said inboard end of said sleeve, wherein said connecting member is formed with a plurality of circumferentially-spaced lugs, said lugs capturing a discrete tone ring, whereby said rotor provides improved resistance to thermal stress that is created during braking.

25. The disc brake rotor for heavy-duty vehicles of claim 24, wherein each one of said lugs is formed with a groove, and said tone ring is formed with bosses, whereby each one of said bosses is received in a respective one of said grooves.

26. The disc brake rotor for heavy-duty vehicles of claim 25, wherein at least one of said bosses is formed with an integral shim.

27. The disc brake rotor for heavy-duty vehicles of claim 25, wherein at least one of said lugs is formed with an opening, and at least one of said bosses is formed with an opening, whereby said lug opening and said boss opening align and receive a fastener to secure a position of said tone ring.

28. The disc brake rotor for heavy-duty vehicles of claim 25, wherein at least one of said bosses is formed with an opening, whereby said boss opening receives a fastener to secure a position of said tone ring.

29. The disc brake rotor for heavy-duty vehicles of claim 25, wherein at least one of said bosses is formed with a tab, said tab capable of being bent to abut a selected one of said lugs to secure a position of said tone ring.

* * * * *

UNITED STATES PATENT AND TRADEMARK OFFICE
CERTIFICATE OF CORRECTION

PATENT NO.          : 9,506,515 B2
APPLICATION NO.     : 14/332443
DATED               : November 29, 2016
INVENTOR(S)         : Jay D. White and Jeffrey S. Morris Page 1 of 1

It is certified that error appears in the above-identified patent and that said Letters Patent is hereby corrected as shown below:

In the Specification

Column 4, Line 59, at the end of the line remove the line break.

Column 9, Line 58, after the words "enabled by" delete the word "and".

Column 11, Line 44, at the beginning of the line delete the word "than".

Column 12, Line 4, after the words "rotor 100 also" delete the word "and".

Column 13, Line 26, after the word "portion." remove the line break.

Column 14, Line 50, after the words "rotor 220 is" replace the word "fowled" with --formed--.

Column 15, Line 58, after the words "may be cast" replace "of" with --or--.

Column 16, Line 10, after the words "108", 108'" delete the number "41".

Column 16, Line 60, after the words "are each" replace the word "fanned" with --formed--.

Signed and Sealed this
Sixth Day of March, 2018

Andrei Iancu
*Director of the United States Patent and Trademark Office*